(12) United States Patent
Wang et al.

(10) Patent No.: US 10,909,481 B2
(45) Date of Patent: Feb. 2, 2021

(54) METHOD AND APPARATUS FOR ANALYZING DATA TABLE

(71) Applicant: Alibaba Group Holding Limited, Grand Cayman (KY)

(72) Inventors: Wei Wang, Zhejiang (CN); Jinpeng Luo, Zhejiang (CN); Min Pan, Zhejiang (CN)

(73) Assignee: Alibaba Group Holding Limited, Grand Cayman (KY)

( * ) Notice: Subject to any disclaimer, the term of this patent is extended or adjusted under 35 U.S.C. 154(b) by 452 days.

(21) Appl. No.: 16/041,336

(22) Filed: Jul. 20, 2018

(65) Prior Publication Data

US 2018/0349811 A1   Dec. 6, 2018

Related U.S. Application Data

(63) Continuation of application No. PCT/CN2017/070977, filed on Jan. 12, 2017.

(30) Foreign Application Priority Data

Jan. 21, 2016   (CN) .......................... 2016 1 0042109

(51) Int. Cl.
*G06F 16/00* (2019.01)
*G06Q 10/06* (2012.01)
(Continued)

(52) U.S. Cl.
CPC .......... *G06Q 10/063* (2013.01); *G06F 16/00* (2019.01); *G06F 16/21* (2019.01);
(Continued)

(58) Field of Classification Search
CPC .... G06F 16/278; G06F 16/2282; G06F 16/21; G06F 16/2453
See application file for complete search history.

(56) References Cited

U.S. PATENT DOCUMENTS

| | | | |
|---|---|---|---|
| 7,260,563 B1 * | 8/2007 | Priyadarshi | G06F 16/2456 707/714 |
| 2006/0253473 A1 | 11/2006 | Agrawal et al. | |

(Continued)

FOREIGN PATENT DOCUMENTS

| | | |
|---|---|---|
| CN | 104899209 A | 9/2015 |
| CN | 105224536 A | 1/2016 |

OTHER PUBLICATIONS

Machine Translated the Chinese Office Action dated May 15, 2020 for Chinese patent application No. 201610042109.0, a counterpart foreign application of U.S. Appl. No. 16/041,336, 13 pages.

(Continued)

*Primary Examiner* — Cheryl Lewis
(74) *Attorney, Agent, or Firm* — Lee & Hayes, P.C.

(57) ABSTRACT

A method including calculating processing cost data of the general data table of the data common layer; determining a general data table on which the external data table of the non-data common layer is dependent; and calculating use cost data of the external data table according to the processing cost data of the general data table. In evaluation of the cost of each general data table of the data common layer, instead of taking into account the storage and computation consumption of the current data table in isolation, several upstream data tables and multiple siblings of the data table are also taken into account comprehensively. The processing cost of the general data table is reasonably and accurately assessed, thus reflecting the advantages and disadvantages of data model construction of the data common layer, and providing decision-making support for the optimization and operation of the models of the data common layer.

20 Claims, 6 Drawing Sheets

(51) Int. Cl.
  *G06F 16/22* (2019.01)
  *G06F 16/21* (2019.01)
  *G06F 16/2453* (2019.01)
  *G06F 16/27* (2019.01)
  *G06F 17/11* (2006.01)
  *G06K 9/62* (2006.01)

(52) U.S. Cl.
  CPC ...... *G06F 16/2282* (2019.01); *G06F 16/2453* (2019.01); *G06F 16/278* (2019.01); *G06F 17/11* (2013.01); *G06K 9/6217* (2013.01)

(56) References Cited

U.S. PATENT DOCUMENTS

| | | | |
|---|---|---|---|
| 2010/0217759 A1* | 8/2010 | Ma | G06F 16/2282 707/719 |
| 2011/0173164 A1* | 7/2011 | Bendel | G06F 16/24561 707/693 |
| 2013/0031064 A1 | 1/2013 | Vo | |
| 2015/0066972 A1* | 3/2015 | Liu | G06F 16/24545 707/765 |
| 2015/0347473 A1 | 12/2015 | Duan et al. | |
| 2017/0060956 A1* | 3/2017 | Akoglu | G06F 21/566 |

OTHER PUBLICATIONS

Machine Translated the Chinese Office Action dated Dec. 31, 2019 for Chinese patent application No. 201610042109.0, a counterpart foreign application of U.S. Appl. No. 16/041,336, 14 pages.
Machine Translated the CN Search Reprot dated May 12, 2020 for CN applicaiton No. 201610042109.0, 1 page.
Machine Translated the CN Search Reprot dated Dec. 23, 2019 for CN applicaiton No. 201610042109.0, 1 page.
The Extended European Search Report dated May 21, 2019 for European Patent Application No. 17740990.1, 9 pages.

* cited by examiner

METHOD AND APPARATUS FOR ANALYZING DATA TABLE

CROSS REFERENCE TO RELATED PATENT APPLICATIONS

This application claims priority to and is a continuation of PCT Patent Application No. PCT/CN2017/070977, filed on 12 Jan. 2017, which claims priority to Chinese Patent Application No. 201610042109.0 filed on 21 Jan. 2016 and entitled "METHOD AND APPARATUS FOR ANALYZING DATA TABLE", which are incorporated herein by reference in their entirety.

TECHNICAL FIELD

The present disclosure relates to the field of big data processing technologies, and, more particularly, to methods and apparatuses for analyzing data tables.

BACKGROUND

The advent of the big data era highlights the demand for storing, computing and processing massive data. Moreover, the correlation and service between data are particularly important. The massive data is generally stored in a cloud computing cluster such as Hadoop or ODPS in a structured or semi-structured form. Relations between the massive data are organized and embodied through data tables stored in the cloud computing cluster, and mutual access, transfer, and exchange of data among different companies as well as different business departments inside the same company are developed, to really put the data in the big data era to good use.

Some common data or general data in hundreds of thousands of data tables in a cloud computing environment may be processed and summarized in a unified manner, to form some highly normalized and unified data tables with strong commonality and high reusability, thus making up a data common layer. Generally, data tables of the data common layer are data that various business departments often need to use.

It is well known that storage, computing, management and maintenance of data in the big data era all need to consume relatively high software and hardware costs and labor costs. Further, how to measure cost consumption brought about by data processing and how to evaluate cost consumption required in data use have become an important and core problem in the mutual visit, transfer and exchange process of the data.

In conventional techniques, processing costs of data tables are only measured according to computational hardware resources (such as CPU consumption and memory consumption) and storage resources (storage medium consumption) consumed during data processing, that is, only storage consumption and computation consumption generated during processing of one current data table are analyzed in isolation. In terms of the use cost of the data table, the data processing cost of the used table is simply allocated equally to various users of the data table, which is obviously not fair and reasonable enough. This will certainly lead to the problem that both the measurement of the data processing cost and the measurement of the data use cost in the conventional techniques are not accurate enough, thus seriously affecting the judgment of validity of data in the cloud computing environment. As a result, the data cost is too high and too many resources are wasted unnecessarily.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

In view of the foregoing problem, the example embodiments of the present disclosure are provided to provide a method for analyzing a data table and a corresponding apparatus for analyzing a data table that may address the foregoing problem or at least partially solve the foregoing problem.

The present disclosure provides a method comprising:
calculating processing cost data of a general data table of a data common layer;
determining a general data table on which an external data table of a non-data common layer is dependent; and
calculating use cost data of the external data table according to the processing cost data of the determined general data table.

For example, the processing cost data of the general data table of the data common layer includes:
extracting a processing cost feature parameter of the general data table of the data common layer; and
calculating the processing cost data of the general data table according to the processing cost feature parameter.

For example, the processing cost feature parameter includes a first scan cost parameter; and the extracting the processing cost feature parameter of the general data table of the data common layer includes:
counting a number of parent tables on which the general data table is dependent;
acquiring a scan size of the general data table with respect to the parent tables; and
counting a number of child tables under the parent tables.

For example, the calculating the processing cost data of the general data table according to the processing cost feature parameter includes:
calculating the first scan cost parameter according to the number of parent tables on which the general data table is dependent, the scan size of the general data table with respect to the parent tables and the number of the child tables under the parent tables.

For example, the processing cost feature parameter further includes a first compute cost parameter and a first storage cost parameter; and
the extracting the processing cost feature parameter of the general data table of the data common layer includes:
extracting a complexity CU of the general data table as the first compute cost parameter; and
extracting a storage size of the general data table as the first storage cost parameter.

For example, one CU represents cost consumption needed by one CPU (core) for one day.

For example, the complexity CU is acquired from a large-scale distributed data processing service.

For example, the calculating the use cost data of the external data table according to the processing cost data of the general data table includes calculating the use cost data of the external data table according to the processing cost feature parameter of the general data table.

For example, the calculating the use cost data of the external data table according to the processing cost feature parameter of the general data table includes:

extracting a processing cost feature parameter of the general data table on which the external data table of the non-data common layer is dependent;

calculating a use cost feature parameter of the external data table according to the processing cost feature parameter; and calculating the use cost data of the external data table according to the use cost feature parameter.

For example, the use cost feature parameter includes a second compute cost parameter; and the extracting the processing cost feature parameter of the general data table on which the external data table of the non-data common layer is dependent includes:

extracting a first compute cost parameter of the general data table on which the external data table is dependent.

For example, the calculating the use cost feature parameter of the external data table according to the processing cost feature parameter includes:

acquiring a compute cost calculation factor between the external data table and the general data table on which the external data table is dependent; and correcting the first compute cost parameter according to the compute cost calculation factor to obtain the second compute cost parameter.

For example, the use cost feature parameter includes a second storage cost parameter;

the extracting the processing cost feature parameter of the general data table on which the external data table of the non-data common layer is dependent includes:

extracting a first storage cost parameter of the general data table on which the external data table is dependent.

For example, the calculating the use cost feature parameter of the external data table according to the processing cost feature parameter includes:

acquiring a storage cost calculation factor between the external data table and the general data table on which the external data table is dependent; and correcting the first storage cost parameter according to the storage cost calculation factor to obtain the second storage cost parameter.

For example, the use cost feature parameter includes a second scan cost parameter;

the extracting the processing cost feature parameter of the general data table on which the external data table of the non-data common layer is dependent includes extracting a first scan cost parameter of the general data table on which the external data table is dependent; and the calculating the use cost feature parameter of the external data table according to the processing cost feature parameter further includes:

acquiring a scan cost calculation factor between the external data table and the general data table on which the external data table is dependent; and correcting the first scan cost parameter according to the storage cost calculation factor to obtain the second scan cost parameter.

For example, the method may further comprises extracting a corresponding general data table when the processing cost data meets a first preset condition.

For example, the extracting the corresponding general data table when the processing cost data meets a first preset condition includes one or more of the following:

extracting a general data table in response to determining that a ratio of a first storage cost parameter of the general data table to a first compute cost parameter of the general data table is higher than a first preset threshold;

extracting a general data table in response to determining that a first compute cost parameter of the general data table is higher than a second preset threshold;

extracting a general data table in response to determining that a ratio of a first scan cost parameter of the general data table to a first compute cost parameter of the general data table is higher than a third preset threshold; and counting a sum of second compute cost parameters of external data tables having a direct dependence relationship with a general data table, and extracting the general data table in response to determining that a first compute cost parameter of the general data table is greater than the sum of the second compute cost parameters.

For example, the extracting the corresponding general data table when the processing cost data meets a first preset condition includes one or more of the following:

counting a sum of second storage cost parameters of external data tables having a direct dependence relationship with a general data table, and extracting the general data table in response to determining that a first storage cost parameter of the general data table is greater than the sum of the second storage cost parameters;

counting a sum of second scan cost parameters of external data tables having a direct dependence relationship with a general data table; and extracting the general data table in response to determining that a first scan cost parameter of the general data table is greater than the sum of the second scan cost parameters.

For example, the method further comprises:

extracting a corresponding external data table when the use cost data meets a second preset condition, wherein the extracting the corresponding external data table when the processing cost data meets the second preset condition includes one or more of the following:

extracting an external data table in response to determining that a ratio of a second storage cost parameter of the external data table to a second compute cost parameter of the external data table is higher than a fourth preset threshold; and extracting an external data table in response to determining that the external data table is capable of obtaining the same data as that in a current general data table from another general data table and a second scan cost parameter of the external data table when acquiring data from the another general data table is less than a second scan cost parameter of the external data table when acquiring data from the current general data table.

In another example embodiment, the present disclosure also provides an apparatus comprising:

one or more processors; and one or more memories storing thereon computer-readable instructions that, when executed by the one or more processors, cause the one or more processors to perform acts comprising:

calculating processing cost data of a general data table of a data common layer;

determining a general data table on which an external data table of a non-data common layer is dependent; and calculating use cost data of the external data table according to the processing cost data of the general data table.

In another example embodiment, the present disclosure also provides one or more memories storing thereon computer-readable instructions that, when executed by one or more processors, cause the one or more processors to perform acts comprising:

calculating processing cost data of a general data table of a data common layer;

determining a general data table on which an external data table of a non-data common layer is dependent; and calculating use cost data of the external data table according to the processing cost data of the general data table, the calculating the processing cost data of the general data table of the data common layer including:

extracting a processing cost feature parameter of the general data table of the data common layer, the processing cost feature parameter including a first scan cost parameter, the extracting the processing cost feature parameter of the general data table of the data common layer including:

counting a number of parent tables on which the general data table is dependent;

acquiring a scan size of the general data table with respect to the parent tables; and counting a number of child tables under the parent tables; and calculating the processing cost data of the general data table according to the processing cost feature parameter.

The detailed operations performed in the example apparatus embodiment and the memories embodiment may refer to those performed in the example method embodiment, and are not described herein for brevity. The example embodiments of the present disclosure include the following advantages:

Firstly, in the example embodiments of the present disclosure, a scan cost parameter is introduced by taking dependence relationships between different data tables into account, which optimizes the method for evaluating costs of the data tables. As such, in evaluation of the cost of each general data table of the data common layer, instead of taking into account the storage and computation consumption of the current data table in isolation, several upstream data tables and multiple siblings of the data table are also taken into account comprehensively. As such, the processing cost of the general data table may be reasonably and accurately assessed, thus reflecting the advantages and disadvantages of data model construction of the data common layer, and providing decision-making support for the optimization and operation of the models of the data common layer.

Secondly, in the example embodiments of the present disclosure, the measurement of the use cost of the external data table may clearly estimate the storage, computation and scanning consumption caused by another external data table's access to the general data table of the data common layer, which facilitates evaluating the reasonability and necessity of an external data table's access to the general data table of the data common layer, thus assisting business departments in optimizing construction of their own data tables, avoiding a waste of resources caused by repeated data construction, increasing the utilization of data resources, reducing the data costs, and achieving the objective of saving costs on the whole.

Thirdly, in the example embodiments of the present disclosure, the cost consumption of an upstream data table may be inherited by downstream data tables based on reasonable proportions by introducing the calculation factor.

At the same time, the use cost of the external data table may be calculated more reasonably and more accurately by comprehensively taking into account factors such as a storage size, a scan size, a reuse degree of the data table, a processing level of the data table and a ratio of hot fields in the data table.

Fourthly, in the example embodiments of the present disclosure, processing cost data of the general data table and use cost data of the external data table are analyzed and compared with a preset threshold, so that a data table with excessively high cost consumption may be identified, which is conducive to the optimization of the data table to further achieve the objective of saving costs.

BRIEF DESCRIPTION OF THE DRAWINGS

To describe the technical solutions in the example embodiments of the present disclosure, the following briefly introduces the accompanying drawings describing the example embodiments. Apparently, the accompanying drawings described in the following merely represent some example embodiments described in the present disclosure, and those of ordinary skill in the art may still derive other drawings from these accompanying drawings without creative efforts.

DETAILED DESCRIPTION

Figure 1:
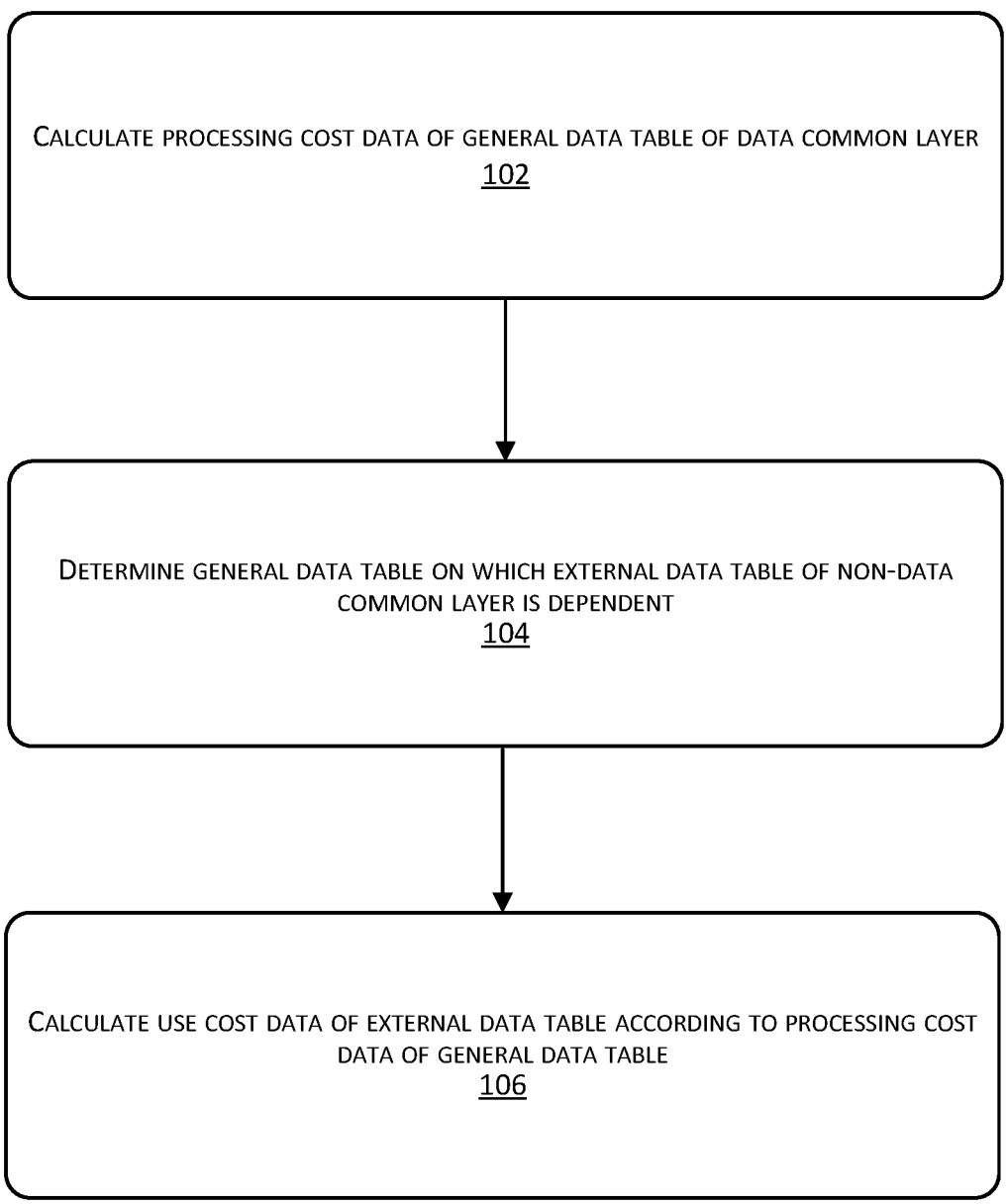
FIG. 1 is a flowchart of steps of example embodiment 1 of a method for analyzing a data table according to the present disclosure.

To make the foregoing objectives, features and advantages of the present disclosure more comprehensible, the present disclosure is described in the following in further detail with reference to the accompanying drawings and example implementations.

In conventional techniques, processing costs of data tables are only measured according to computational hardware resources (such as CPU consumption and memory consumption) and storage resources (storage medium consumption) consumed during data processing. However, data in a generated data table may be from N upstream data tables. That is, generation of a data table needs to be dependent on N upstream data tables. However, an existing cost measuring model only analyzes storage consumption and computation consumption generated during processing of the current data table in isolation, and does not take a dependence relationship between data tables into account. As a result, scanning consumption between the data tables is ignored.

In conventional techniques, in terms of the use cost of a data table, data processing cost of a used table is simply allocated equally to various users of the data table, instead of employing different allocation manners according to different specific access conditions of the various users. Different users use the same data table differently. Some users access a relatively large amount of data, and the computation is relatively complex. Some users only read a small amount of data, and the computation is very simple. If the manner of equal allocation is employed, the scan costs borne by the two kinds of users are the same, which is obviously unfair and unreasonable.

To solve the foregoing problem, the present disclosure discloses a method for analyzing a data table, wherein the data table includes a general data table of a data common layer and an external data table of a non-data common layer, and the method includes:

calculating processing cost data of the general data table of the data common layer;

determining a general data table on which the external data table of the non-data common layer is dependent; and calculating use cost data of the external data table according to the processing cost data of the general data table.

In an example embodiment, the step of calculating processing cost data of the general data table of the data common layer includes:

extracting a processing cost feature parameter of the general data table of the data common layer; and calculating the processing cost data of the general data table according to the processing cost feature parameter.

In an example embodiment, the processing cost feature parameter includes a first scan cost parameter, and the sub-step of extracting a processing cost feature parameter of the general data table of the data common layer further includes:

counting the number of parent tables on which the general data table is dependent;

acquiring a scan size of the general data table with respect to the parent table; and counting the number of all child tables under the parent table; and the sub-step of calculating the processing cost data of the general data table according to the processing cost feature parameter further includes:

calculating the first scan cost parameter according to the number of parent tables on which the general data table is dependent, the scan size of the general data table with respect to the parent table and the number of all child tables under the parent table.

In an example embodiment, the processing cost feature parameter further includes a first compute cost parameter and a first storage cost parameter, and the sub-step of extracting a processing cost feature parameter of the general data table of the data common layer further includes:

extracting a complexity CU of the general data table as the first compute cost parameter; and extracting a storage size of the general data table as the first storage cost parameter.

In an example embodiment, the first scan cost parameter is calculated according to the number of parent tables on which the general data table is dependent, the scan size of the general data table with respect to the parent table and the number of all child tables under the parent table by using the following formula:

$$ScanCost(i, j) = Cost(j) * \frac{ScanSize(i, j)}{\sum_{m=1}^{n} ScanSize(m, j)}$$

wherein Cost(j) represents processing cost data of a data table j, the data table j represents m parent tables on which a data table i is dependent, and the m parent tables are numbered 1 . . . m, ScanSize(i,j) represents a scan size of the general data table i with respect to the parent table j, and the data table m represents all child tables of the parent table j, which are numbered 1 . . . n.

In an example embodiment, the processing cost data of the general data table is calculated according to the processing cost feature parameter by using the following formula:

$$Cost(i) = ComputeCost(i) + StorageCost(i) + \sum_{j=1}^{n} ScanCost(i, j)$$

wherein ComputeCost(i) represents a first compute cost parameter of a general data table i;

StorageCost(i) represents a first storage cost parameter of the general data table i; and ScanCost(i,j) represents a first scan cost parameter of the general data table i with respect to a parent table j.

In an example embodiment, the step of calculating use cost data of the external data table according to the processing cost data of the general data table is:

calculating the use cost data of the external data table according to the processing cost feature parameter of the general data table.

In an example embodiment, the step of calculating the use cost data of the external data table according to the processing cost feature parameter of the general data table includes:

extracting a processing cost feature parameter of the general data table on which the external data table of the non-data common layer is dependent;

calculating a use cost feature parameter of the external data table according to the processing cost feature parameter; and calculating the use cost data of the external data table according to the use cost feature parameter.

In an example embodiment, the use cost feature parameter includes a second compute cost parameter;

the sub-step of extracting a processing cost feature parameter of the general data table on which the external data table of the non-data common layer is dependent is:

extracting a first compute cost parameter of the general data table on which the external data table is dependent; and the step of calculating a use cost feature parameter of the external data table according to the processing cost feature parameter includes:

acquiring a compute cost calculation factor between the external data table and the general data table on which the external data table is dependent; and correcting the first compute cost parameter according to the compute cost calculation factor to obtain the second compute cost parameter.

In an example embodiment, the use cost feature parameter includes a second storage cost parameter;

the sub-step of extracting a processing cost feature parameter of the general data table on which the external data table of the non-data common layer is dependent is:

extracting a first storage cost parameter of the general data table on which the external data table is dependent; and the step of calculating a use cost feature parameter of the external data table according to the processing cost feature parameter further includes:

acquiring a storage cost calculation factor between the external data table and the general data table on which the external data table is dependent; and correcting the first storage cost parameter according to the storage cost calculation factor to obtain the second storage cost parameter.

In an example embodiment, the use cost feature parameter includes a second scan cost parameter;

the sub-step of extracting a processing cost feature parameter of the general data table on which the external data table of the non-data common layer is dependent is:

extracting a first scan cost parameter of the general data table on which the external data table is dependent; and the step of calculating a use cost feature parameter of the external data table according to the processing cost feature parameter further includes:

acquiring a scan cost calculation factor between the external data table and the general data table on which the external data table is dependent; and correcting the first scan cost parameter according to the storage cost calculation factor to obtain the second scan cost parameter.

In an example embodiment, the sub-step of acquiring a compute cost calculation factor between the external data table and the general data table on which the external data table is dependent further includes:

acquiring the number of data tables that have scanned the general data table on each of the last m days and an average child table number of the general data table in the last m days; and calculating the cost calculation factor according to the number of data tables that have scanned the general data table on each of the last m days and the average child table number of the general data table in the last m days by using the following formula:

$$compfac(i, j) = \frac{1}{avg\left(\sum_{m=1}^{90} scan_m(j)\right)}$$

wherein m represents each of the last m days;

$scan_m(j)$ represents the number of data tables that have scanned a general data table j on the $m^{th}$ day; and the denominator represents an example of the average child table number of the general data table j in the last 90 days.

In an example embodiment, the sub-step of acquiring a storage cost calculation factor between the external data table and the general data table on which the external data table is dependent further includes:

acquiring a scan size of the external data table with respect to the general data table on which the external data table is dependent and k tables dependent on the general data table; and calculating the storage cost calculation factor according to the scan size of the external data table with respect to the general data table on which the external data table is dependent and the k tables dependent on the general data table by using the following formula:

$$storfac(i, j) = \frac{scansize(i, j)}{\sum_{m=1}^{k} scansize(m, j)}$$

wherein scansize(i,j) represents a scan size of an external data table i with respect to a general data table j; and m represents k tables dependent on the general data table j, which are numbered 1 . . . k.

In an example embodiment, the sub-step of acquiring a scan cost calculation factor between the external data table and the general data table on which the external data table is dependent further includes:

acquiring a ratio of a hot field in the general data table and a dependence level of the general data table in the current data common layer, the hot field being such a field: the number of times the hot field is used in a time period is greater than the number of direct downstream data tables of the general data table; and calculating the scan cost calculation factor according to the ratio of the hot field in the general data table and the dependence level of the general data table in the current data common layer by using the following formula:

$$scanfac(i, j) = \frac{hot\_ratio(j)}{\log2(level(j) + 1)}$$

wherein hot_ratio(j) represents a ratio that the number of hot fields in a general data table j accounts for in the total number of fields in the table; and level(j) represents a dependence level of the general data table j in the data common layer.

In an example embodiment, the use cost data of the external data table is calculated according to the use cost feature parameter by using the following formula:

cost(i,j)=compcost(j)*compfac(i,j)+storcost(j)*storfac(j)+scancost(j)*scanfac(i,j)

wherein i represents an external data table, j represents a general data table, and there is a dependence relationship between the data table i and the data table j;

cost(i,j) represents use cost data of the external data table i using the general data table compcost(j) represents a first compute cost parameter in processing cost data of the general data table j;

compfac(i,j) represents a compute cost calculation factor between the external data table i and the general data table j;

storcost(j) represents a first storage cost parameter in the processing cost data of the general data table j;

storfac(i,j) represents a storage cost calculation factor between the external data table i and the general data table j;

scancost(j) represents a first scan cost parameter in the processing cost data of the general data table j; and scanfac(i,j) represents a scan cost calculation factor between the external data table i and the general data table j.

In an example embodiment, the method further includes:

extracting the corresponding general data table when the processing cost data meets a first preset condition.

In an example embodiment, the step of extracting the corresponding general data table when the processing cost data meets a first preset condition includes any one or more of the following operations:

extracting a general data table if a ratio of a first storage cost parameter of the general data table to a first compute cost parameter of the general data table is higher than a first preset threshold;

extracting a general data table if a first compute cost parameter of the general data table is higher than a second preset threshold;

extracting a general data table if a ratio of a first scan cost parameter of the general data table to a first compute cost parameter of the general data table is higher than a third preset threshold;

counting the sum of second compute cost parameters of external data tables having a direct dependence relationship with a general data table, and extracting the general data table if a first compute cost parameter of the general data table is greater than the sum of the second compute cost parameters;

counting the sum of second storage cost parameters of external data tables having a direct dependence relationship with a general data table, and extracting the general data table if a first storage cost parameter of the general data table is greater than the sum of the second storage cost parameters; and counting the sum of second scan cost parameters of external data tables having a direct dependence relationship with a general data table, and extracting the general data table if a first scan cost parameter of the general data table is greater than the sum of the second scan cost parameters.

In an example embodiment, the method further includes:

extracting the corresponding external data table when the use cost data meets a second preset condition.

In an example embodiment, the step of extracting the corresponding external data table when the processing cost data meets a second preset condition includes one or more of the following operations:

extracting an external data table if a ratio of a second storage cost parameter of the external data table to a second compute cost parameter of the external data table is higher than a fourth preset threshold; and extracting an external data table if the external data table is capable of obtaining the same data as that in a current general data table from another general data table and a second scan cost parameter of the external data table when acquiring data from the another general data table is less than a second scan cost parameter of the external data table when acquiring data from the current general data table.

To solve the foregoing problem, the present disclosure further discloses an apparatus for analyzing a data table, wherein the data table includes a general data table of a data common layer and an external data table of a non-data common layer, the apparatus including:

a processing cost calculation module configured to calculate processing cost data of the general data table of the data common layer;

a determining module configured to determine a general data table on which the external data table of the non-data common layer is dependent; and a use cost calculation module configured to calculate use cost data of the external data table according to the processing cost data of the general data table.

In an example embodiment, the processing cost calculation module includes:

a processing cost feature parameter extraction submodule configured to extract a processing cost feature parameter of the general data table of the data common layer; and a processing cost calculation submodule configured to calculate the processing cost data of the general data table according to the processing cost feature parameter.

In an example embodiment, the processing cost feature parameter includes a first scan cost parameter, and the processing cost feature parameter extraction submodule further includes:

a parent table number counting unit configured to count the number of parent tables on which the general data table is dependent;

a scan size acquiring unit configured to acquire a scan size of the general data table with respect to the parent table; and a child table number counting unit configured to count the number of all child tables under the parent table; and the processing cost calculation submodule further includes:

a first scan cost calculation unit configured to calculate the first scan cost parameter according to the number of parent tables on which the general data table is dependent, the scan size of the general data table with respect to the parent table and the number of all child tables under the parent table.

In an example embodiment, the processing cost feature parameter further includes a first compute cost parameter and a first storage cost parameter, and the processing cost feature parameter extraction submodule further includes:

a first compute cost parameter extraction unit configured to extract a complexity CU of the general data table as the first compute cost parameter; and a first storage cost parameter extraction unit configured to extract a storage size of the general data table as the first storage cost parameter.

In an example embodiment, the first scan cost parameter is calculated according to the number of parent tables on which the general data table is dependent, the scan size of the general data table with respect to the parent table and the number of all child tables under the parent table by using the following formula:

$$ScanCost(i, j) = Cost(j) * \frac{ScanSize(i, j)}{\sum_{m=1}^{n} ScanSize(m, j)}$$

wherein Cost(j) represents processing cost data of a data table j, the data table j represents m parent tables on which a data table i is dependent, and the m parent tables are numbered 1 . . . m, ScanSize(i,j) represents a scan size of the general data table i with respect to the parent table j, and the data table m represents all child tables of the parent table j, which are numbered 1 . . . n.

In an example embodiment, the processing cost data of the general data table is calculated according to the processing cost feature parameter by using the following formula:

$$Cost(i) = ComputeCost(i) + StorageCost(i) + \sum_{j=1}^{n} ScanCost(i, j)$$

wherein ComputeCost(i) represents a first compute cost parameter of a general data table i;

StorageCost(i) represents a first storage cost parameter of the general data table i; and ScanCost(i,j) represents a first scan cost parameter of the general data table i with respect to a parent table j.

In an example embodiment, the use cost calculation module includes:

a use cost calculation submodule configured to calculate the use cost data of the external data table according to the processing cost feature parameter of the general data table.

In an example embodiment, the use cost calculation submodule includes:

a processing cost feature parameter extraction unit configured to extract a processing cost feature parameter of the general data table on which the external data table of the non-data common layer is dependent;

a use cost feature parameter calculation unit configured to calculate a use cost feature parameter of the external data table according to the processing cost feature parameter; and a use cost data calculation unit configured to calculate the use cost data of the external data table according to the use cost feature parameter.

In an example embodiment, the use cost feature parameter includes a second compute cost parameter;

the processing cost feature parameter extraction unit includes:

a first compute cost parameter extraction subunit configured to extract a first compute cost parameter of the general data table on which the external data table is dependent; and the use cost feature parameter calculation unit includes:

a compute cost calculation factor acquiring subunit configured to acquire a compute cost calculation factor between the external data table and the general data table on which the external data table is dependent; and a second compute cost parameter calculation subunit configured to correct the first compute cost parameter according to the compute cost calculation factor to obtain the second compute cost parameter.

In an example embodiment, the use cost feature parameter includes a second storage cost parameter;

the processing cost feature parameter extraction unit includes:

a first storage cost parameter extraction subunit configured to extract a first storage cost parameter of the general data table on which the external data table is dependent; and the use cost feature parameter calculation unit further includes:

a storage cost calculation factor acquiring subunit configured to acquire a storage cost calculation factor between the external data table and the general data table on which the external data table is dependent; and a second storage cost parameter calculation subunit configured to correct the first storage cost parameter according to the storage cost calculation factor to obtain the second storage cost parameter.

In an example embodiment, the use cost feature parameter includes a second scan cost parameter;

the processing cost feature parameter extraction unit includes:

a first scan cost parameter extraction subunit configured to extract a first scan cost parameter of the general data table on which the external data table is dependent; and the use cost feature parameter calculation unit further includes:

a scan cost calculation factor acquiring subunit configured to acquire a scan cost calculation factor between the external data table and the general data table on which the external data table is dependent; and a second scan cost parameter calculation subunit configured to correct the first scan cost parameter according to the storage cost calculation factor to obtain the second scan cost parameter.

In an example embodiment, the compute cost calculation factor acquiring subunit is further configured to:

acquire the number of data tables that have scanned the general data table on each of the last m days and an average child table number of the general data table in the last m days; and calculate the cost calculation factor according to the number of data tables that have scanned the general data table on each of the last m days and the average child table number of the general data table in the last m days by using the following formula:

$$compfac(i, j) = \frac{1}{avg\left(\sum_{m=1}^{90} scan_m(j)\right)}$$

wherein m represents each of the last m days;

$scan_m(j)$ represents the number of data tables that have scanned a general data table j on the $m^{th}$ day; and the denominator represents an example of the average child table number of the general data table j in the last 90 days.

In an example embodiment, the storage cost calculation factor acquiring subunit is further configured to:

acquire a scan size of the external data table with respect to the general data table on which the external data table is dependent and k tables dependent on the general data table; and calculate the storage cost calculation factor according to the scan size of the external data table with respect to the general data table on which the external data table is dependent and the k tables dependent on the general data table by using the following formula:

$$storfac(i, j) = \frac{scansize(i, j)}{\sum_{m=1}^{k} scansize(m, j)}$$

wherein scansize(i,j) represents a scan size of an external data table i with respect to a general data table j; and m represents k tables dependent on the general data table j, which are numbered 1 . . . k.

In an example embodiment, the scan cost calculation factor acquiring subunit is further configured to:

acquire a ratio of a hot field in the general data table and a dependence level of the general data table in a current data common layer, the hot field being such a field: the number of times the hot field is used in a time period is greater than the number of direct downstream data tables of the general data table; and calculate the scan cost calculation factor according to the ratio of the hot field in the general data table and the dependence level of the general data table in the current data common layer by using the following formula:

$$scanfac(i, j) = \frac{hot\_ratio(j)}{log2(level(j) + 1)}$$

wherein hot_ratio(j) represents a ratio that the number of hot fields in a general data table j accounts for in the total number of fields in the table; and level(j) represents a dependence level of the general data table j in the data common layer.

In an example embodiment, the use cost data of the external data table is calculated according to the use cost feature parameter by using the following formula:

$$\text{cost}(i,j)=\text{compcost}(j)*\text{compfac}(i,j)+\text{storcost}(j)*\text{storfac}(j)+\text{scancost}(j)*\text{scanfac}(i,j)$$

wherein i represents an external data table, j represents a general data table, and there is a dependence relationship between the data table i and the data table j;

cost(i,j) represents use cost data of the external data table i using the general data table compcost(j) represents a first compute cost parameter in processing cost data of the general data table j;

compfac(i,j) represents a compute cost calculation factor between the external data table i and the general data table j;

storcost(j) represents a first storage cost parameter in the processing cost data of the general data table j;

storfac(i,j) represents a storage cost calculation factor between the external data table i and the general data table j;

scancost(j) represents a first scan cost parameter in the processing cost data of the general data table j; and scanfac(i,j) represents a scan cost calculation factor between the external data table i and the general data table j.

In an example embodiment, the apparatus further includes:

a first extraction module configured to extract the corresponding general data table when the processing cost data meets a first preset condition.

In an example embodiment, the first extraction module includes one or more of the following modules:

a first extraction submodule configured to extract a general data table if a ratio of a first storage cost parameter of the general data table to a first compute cost parameter of the general data table is higher than a first preset threshold;

a second extraction submodule configured to extract a general data table if a first compute cost parameter of the general data table is higher than a second preset threshold;

a third extraction submodule configured to extract a general data table if a ratio of a first scan cost parameter of the general data table to a first compute cost parameter of the general data table is higher than a third preset threshold;

a fourth counting submodule configured to count the sum of second compute cost parameters of external data tables having a direct dependence relationship with a general data table, and a fourth extraction submodule configured to extract the general data table if a first compute cost parameter of the general data table is greater than the sum of the second compute cost parameters;

a fifth counting submodule configured to count the sum of second storage cost parameters of external data tables having a direct dependence relationship with a general data table, and a fifth extraction submodule configured to extract the general data table if a first storage cost parameter of the general data table is greater than the sum of the second storage cost parameters; and a sixth counting submodule configured to count the sum of second scan cost parameters of external data tables having a direct dependence relationship with a general data table, and a sixth extraction submodule configured to extract the general data table if a first scan cost parameter of the general data table is greater than the sum of the second scan cost parameters.

In an example embodiment, the apparatus further includes:

a second extraction module configured to extract the corresponding external data table when the use cost data meets a second preset condition.

In an example embodiment, the second extraction module includes one or more of the following submodules:

a seventh extraction submodule configured to extract an external data table if a ratio of a second storage cost parameter of the external data table to a second compute cost parameter of the external data table is higher than a fourth preset threshold; and an eighth extraction submodule configured to extract an external data table if the external data table is capable of obtaining the same data as that in a current general data table from another general data table and a second scan cost parameter of the external data table when acquiring data from the another general data table is less than a second scan cost parameter of the external data table when acquiring data from the current general data table.

With respect to the foregoing problems, the present disclosure creatively proposes two measuring models for analyzing a data table, which are respectively a data processing cost measuring model for a data common layer and a data use cost measuring model for an external data object BU accessing data of the data common layer.

To enable those skilled in the art to better understand the present disclosure, two exemplary measuring modules involved in the example embodiments of the present disclosure are briefly described in the following:

Firstly, the data processing cost measuring model for the data common layer includes three parts, i.e., compute cost evaluation, storage cost evaluation and scan cost evaluation. The compute cost evaluation and the storage cost evaluation reflect actual software and hardware consumption of the data table during data processing from the perspective of the general data table itself. In consideration of the dependence relationship between data tables during data processing, the scan cost is calculated by sharing the cost of a parent table according to a ratio that a scan size of a child table with respect to the parent table accounts for in an overall scan size of the parent table, to obtain a scan cost of the child table with respect to the parent table.

Secondly, the data use cost measuring model for an external data object BU accessing data of the data common layer may obtain three parts of cost of the used data table, i.e., compute cost, storage cost and scan cost, based on a measurement method of data processing cost consumption. The use cost of the data table may be calculated by allocating the three parts of cost proportionally and then performing weighted summation. Proportional allocation algorithms for the three parts of cost may be different from each other.

Applying the two kinds of measurement models to actual data analyzing may at least solve the following technical problems:

1) proportions of a storage cost, a compute cost and a scan cost of a data table of a data common layer may be obtained;

2) a scan size may be reduced when the storage cost is higher than a threshold;

3) the computational logic of the data table may be optimized when the compute cost is higher than a threshold, thus reducing the amount of computation;

4) a processing link of the data table may be optimized when the scan cost is higher than a threshold, thus reducing the amount of useless data scanned from the parent table;

5) data users are controlled, and only a necessary amount of data is read from the common layer, thus reducing scanning of useless data; and 6) data users are controlled, and tables at deeper levels are used as much as possible (the tables at deeper levels are good-quality tables deeply processed by the data common layer).

Generally, only when the data processing cost of each data table of the data common layer is less than the sum of use costs of direct downstream data of the table, may the data table meet the requirements of the data common layer and be worth existing in the data common layer.

Referring to FIG. 1, a flowchart of steps of example embodiment 1 of a method for analyzing a data table according to the present disclosure is shown, wherein the data table may include a general data table of a data common layer and an external data table of a non-data common layer, and the method may include the following steps:

Step 102. Processing cost data of the general data table of the data common layer is calculated.

In the example embodiment of the present disclosure, the processing cost data of the general data table not only may include computational hardware resources (such as CPU consumption and memory consumption) and storage resources (storage medium consumption) consumed during data processing of the data table, but also may include dependence relationships between data tables, that is, scan consumption between the data tables.

Figure 2:
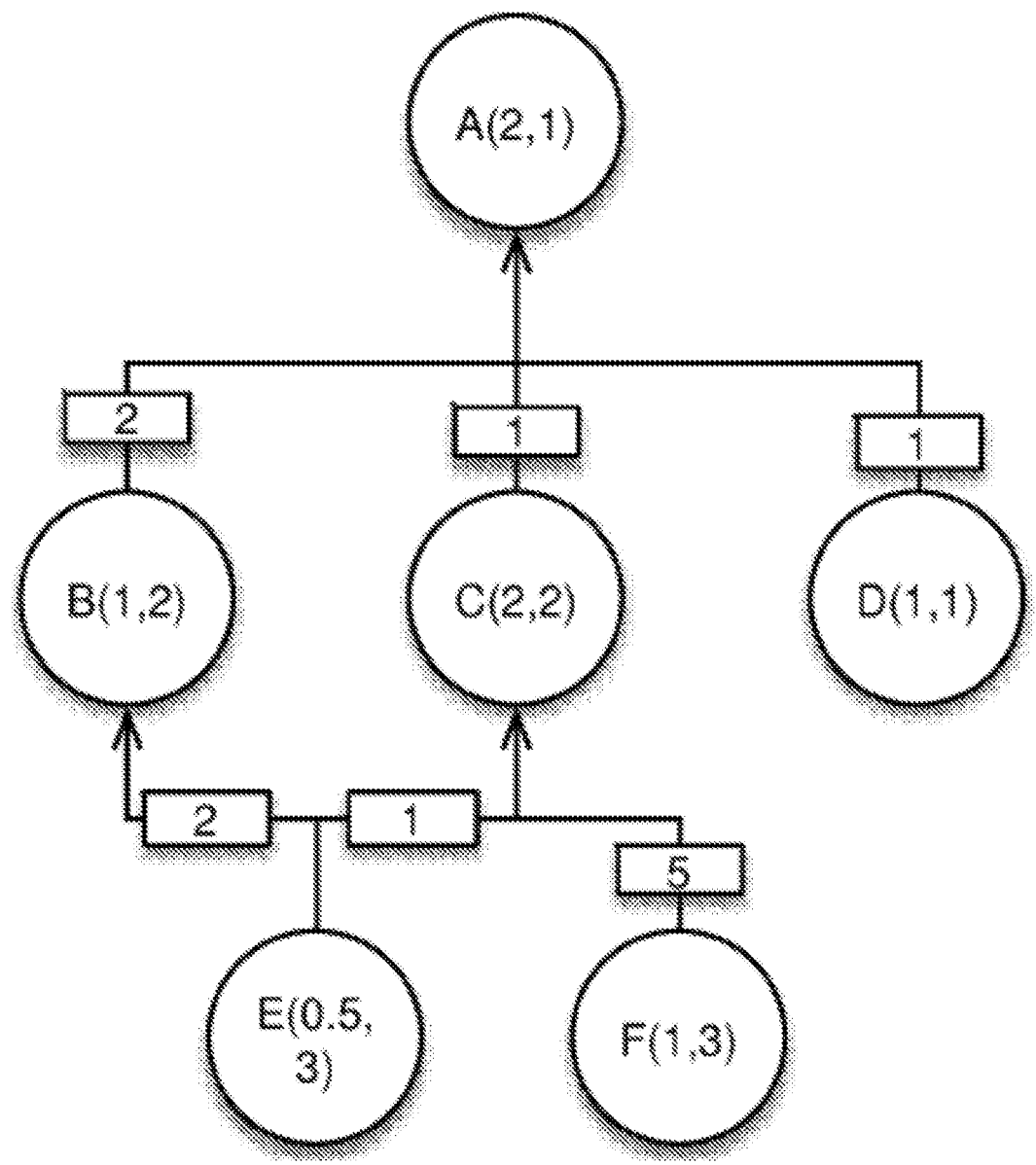
FIG. 2 is a schematic diagram of a model of general data tables of a data common layer according to the present disclosure.

Data in a generated data table may be from N upstream data tables. Therefore, the scan consumption between data tables reflects a scan size with respect to a data table being depended on that may be used in the process of processing the data tables. Referring to FIG. 2, a schematic diagram of a model of general data tables of a data common layer is shown. Each circle A, B, C, D, E and F represent one of six general data tables of the data common layer respectively. Arrows between two circles in the figure represent a mutual data access relationship between two general data tables, that is, a scan relationship. For example, the arrow between the general data table A and the general data table B represents that the general data table B needs to scan the general data table A. The number on the arrow indicates the size of the scan, of which the unit is TB. Therefore, the general data table B needs to scan 2 TB data of the general data table A in FIG. 2.

In an example embodiment of the present disclosure, the step of calculating processing cost data of the general data table of the data common layer may include the following sub-steps:

Sub-step A. A processing cost feature parameter of the general data table of the data common layer is extracted.

Sub-step B. The processing cost data of the general data table is calculated according to the processing cost feature parameter.

In an example embodiment of the present disclosure, the processing cost feature parameter may include a first compute cost parameter and a first storage cost parameter, and the sub-step of extracting a processing cost feature parameter of the general data table of the data common layer may further include:

extracting a complexity CU of the general data table as the first compute cost parameter; and extracting a storage size of the general data table as the first storage cost parameter.

In the example embodiment of the present disclosure, the first compute cost parameter may be CPU resources needing to be consumed by the general data table during data processing, and may be calculated with a complexity CU. 1 CU represents cost consumption needed by one CPU (core) to run one day. The complexity CU may be acquired from Open Data Processing Service (ODPS) cluster metadata. The ODPS is a large-scale distributed data processing service, and may support processing of massive data.

The first storage cost parameter may be hard disk storage resources needing to be consumed when the general data table is stored, and may be calculated with a storage size TU. 1 TU represents cost consumption needed by storage of 1 TB data one day. The storage size TU may also be acquired from the ODPS cluster metadata.

In the example embodiment of the present disclosure, in order to uniformly and comprehensively measure the complexity that takes CU as the unit and the storage size that takes TU as the unit, a new resource consumption measurement unit, that is, resource unit denoted as CT, may be introduced. A conversion relation between the resource unit and the complexity CU is 1 CT=4 CU. A conversion relation between the resource unit and the storage size TU is 1 CT=9 TU.

For example, if the complexity consumed in processing of a general data table is 1 CU and the storage size consumed is 2 TU, resources consumed by the general data table during processing are 1/4+2/9=0.47 CT.

In another example embodiment of the present disclosure, the processing cost feature parameter may further include a first scan cost parameter, and the sub-step of extracting a processing cost feature parameter of the general data table of the data common layer may further include:

counting the number of parent tables on which the general data table is dependent;

acquiring a scan size of the general data table with respect to the parent table; and counting the number of all child tables under the parent table; and the sub-step of calculating the processing cost data of the general data table according to the processing cost feature parameter may further include:

calculating the first scan cost parameter according to the number of parent tables on which the general data table is dependent, the scan size of the general data table with respect to the parent table and the number of all child tables under the parent table.

For example, referring to FIG. 2, the arrow between the general data table C and the general data table A represents that the general data table C needs to scan the general data table A, that is, the general data table A is a parent table of the general data table C. The number on the arrow represents that the scan size of the child table C with respect to the parent table A is 1 TB. The parent table A has 3 child tables, that is, the general data table B, the general data table C and the general data table D. The first scan cost parameter may be calculated by using the foregoing data.

In an example implementation, the first scan cost parameter may be calculated by using the following formula:

$$ScanCost(i, j) = Cost(j) * \frac{ScanSize(i, j)}{\sum_{m=1}^{n} ScanSize(m, j)}$$

wherein Cost(j) represents processing cost data of a data table j, the data table j represents m parent tables on which a data table i is dependent, and the m parent tables are numbered 1 . . . m, ScanSize(i,j) represents a scan size of the general data table i with respect to the parent table j, and the data table m represents all child tables of the parent table j, which are numbered 1 . . . n.

In an example embodiment of the present disclosure, the processing cost data of the general data table may be calculated according to the first compute cost parameter, the first storage cost parameter and the first scan cost parameter.

In an example implementation, the processing cost data of the general data table may be calculated by using the following formula:

$$\text{Cost}(i) = \text{ComputeCost}(i) + \text{StorageCost}(i) + \sum_{j=1}^{n} \text{ScanCost}(i, j)$$

wherein ComputeCost(i) represents a first compute cost parameter of a general data table i;

StorageCost(i) represents a first storage cost parameter of the general data table i; and ScanCost(i,j) represents a first scan cost parameter of the general data table i with respect to a parent table j.

Therefore, processing cost data of the general data tables in FIG. 2 may be calculated as follows:

| | |
|---|---|
| 2/9+1/4+0=0.472 CT | General data table A: |
| 1/9+2/4+0.472*(2/(2+1+1))=0.845 CT | General data table B: |
| 2/9+2/4/0.472*(1/(2+1+1))=0.840 CT | General data table C: |
| 1/9+1/4+0.472*(1/(2+1+1))=0.479 CT | General data table D: |
| 0.5/9+3/4+0.854*2/2+0.840*(1/(1+5))=<br>1.800 CT | General data table E: |
| 1/9+3/4+0.840*(5/(1+5))=1.561 CT | General data table F: |

The foregoing example is merely intended to help understand the example embodiment of the present disclosure and should not be understood as limiting the present disclosure. Those skilled in the art may obtain corresponding processing cost data by using the method and the formulas described in the example embodiment of the present disclosure according to actual dependence relationships between general data tables in the data common layer.

Step 104. A general data table on which the external data table of the non-data common layer is dependent is determined.

Figure 3:
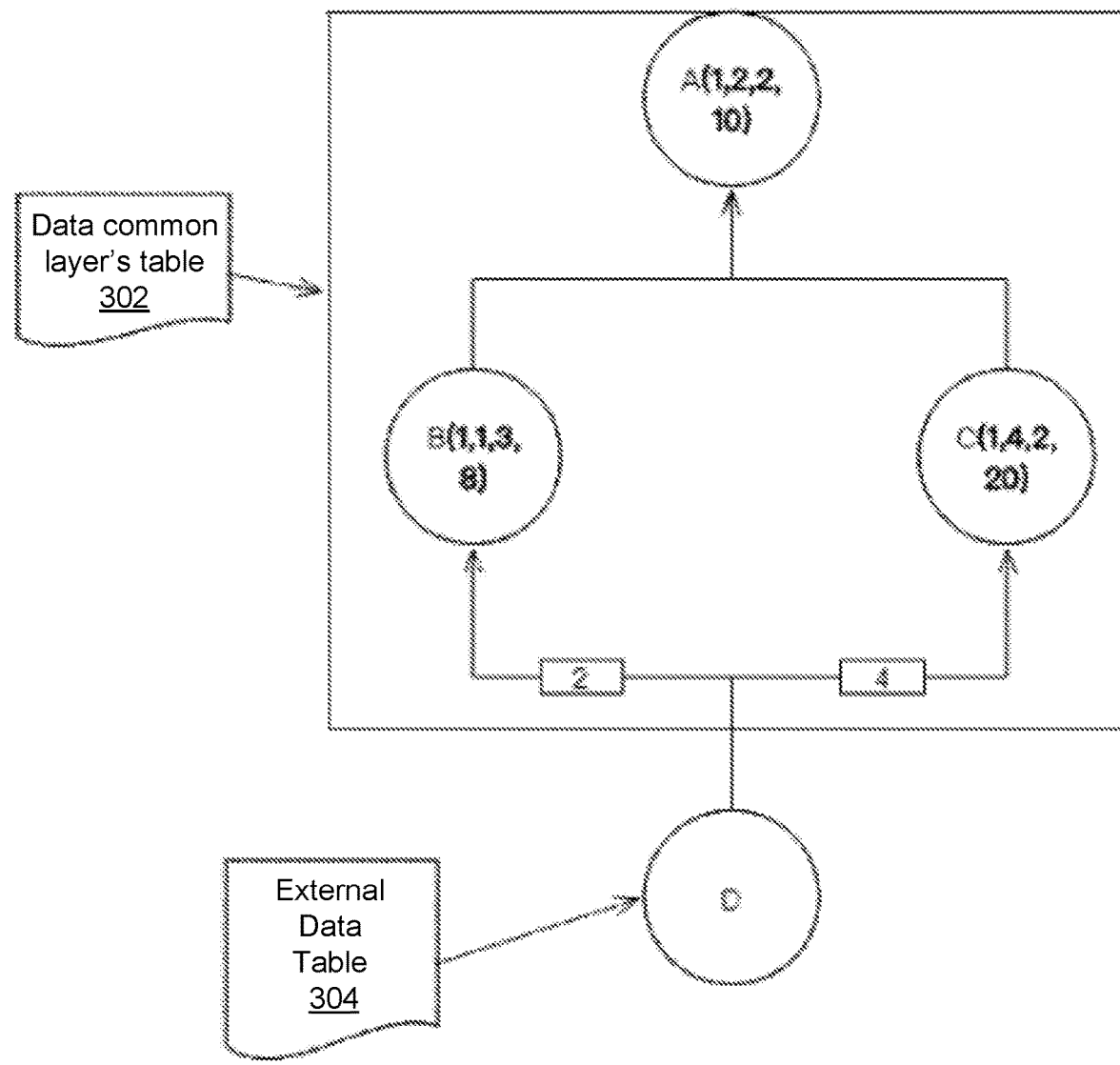
FIG. 3 is a schematic diagram of a relationship between a general data table and an external data table according to the present disclosure.

In the example embodiment of the present disclosure, a general data table on which an external data table of a non-data common layer is dependent may be determined first for the external data table. Referring to FIG. 3, a schematic diagram of a relationship between a general data table and an external data table is shown. In FIG. 3, Table A, Table B and Table C represent general data tables of the data common layer respectively, i.e., data common layer's table 302, and Table D represents an external data table 304 of a non-data common layer. The external data table D may access the general data table B and the general data table C. 4 numbers in the circle of each general data table represent the first compute cost parameter, the first storage cost parameter, the first scan cost parameter and the total data storage size of the general data table respectively.

For example, referring to FIG. 3, the first compute cost parameter of the general data table A is 1 CT, the first storage cost parameter is 2 CT, the first scan cost parameter is 2 CT, and the data storage size of the general data table A is 10 TB. The number on the arrow between the external data table D and the general data table B indicates that the external data table D scans 2 TB data of the general data table B.

The foregoing example is merely an example of the relationship between the general data table and the external data table, and should not be understood as limitation on the present disclosure. Those skilled in the art may determine an actual dependence relationship and a data scanning condition between an external data table and a general data table according to an actual situation by using the method described in the example embodiment of the present disclosure.

Step 106. Use cost data of the external data table is calculated according to the processing cost data of the general data table.

In the example embodiment of the present disclosure, as there is a dependence relationship between the external data table and the general data table, use cost data of the external data table may be calculated according to the processing cost data of the general data table. For example, the use cost data of the external data table may be calculated according to the processing cost feature parameter of the general data table.

In an example embodiment of the present disclosure, the step of calculating use cost data of the external data table according to the processing cost feature parameter of the general data table may include:

extracting a processing cost feature parameter of the general data table on which the external data table of the non-data common layer is dependent;

calculating a use cost feature parameter of the external data table according to the processing cost feature parameter; and calculating the use cost data of the external data table according to the use cost feature parameter.

In an example implementation, after the general data table on which the external data table of the non-data common layer is dependent is determined, the processing feature parameter of the general data table may be extracted, so that a use cost feature parameter of the external data table may be calculated according to the dependence relationship between the external data table and the general data table, thus obtaining the use cost data of the external data table.

Further, the use cost feature parameter may include a second compute cost parameter, a second storage cost parameter and a second scan cost parameter.

The second compute cost parameter may be CPU resources needing to be consumed by the external data table in the process of using the general data table of the data common layer, and may also be calculated with a complexity CU. The second storage cost parameter may be hard disk storage resources needing to be consumed when the general data table is stored, and may be calculated with a storage size TU. The second scan cost parameter may reflect a scan relationship between the external data table and the general data table of the data common layer.

In an example embodiment of the present disclosure, the method may further include step A and step B (not shown in FIG. 1).

Step A. The corresponding general data table is extracted when the processing cost data meets a first preset condition.

Step B. The corresponding external data table is extracted when the use cost data meets a second preset condition.

In an example implementation, after the processing cost data of the general data table and the use cost data of the external data table are obtained, the processing cost data and the use cost data may be compared with a first preset condition and a second preset condition respectively, to determine whether the corresponding preset condition is met. If yes, the corresponding general data table or the external data table may be extracted.

For example, after the first compute cost parameter, the first storage cost parameter and the first scan cost parameter are obtained of the general data table of the data common layer are obtained respectively, it may be judged whether the first compute cost parameter, the first storage cost parameter and the first scan cost parameter meet preset conditions respectively. If the first storage cost parameter is too high, it is possible to consider reducing the storage size for the general data table. If the first compute cost parameter is relatively high, it is possible to optimize the computational logic of the general data table and reduce the computation complexity. If the first scan cost parameter is relatively high, it is possible to optimize a processing link of the general data table to reduce the amount of useless data scanned from the parent table.

For the external data table of the data common layer, it is possible to urge data users according to the obtained use cost data to read only a necessary amount of data from the data common layer, thus reducing useless data scanning, and to try to use general data tables at deeper levels as much as possible, because the general data tables at deeper levels are all good-quality tables deeply processed by the data common layer.

In the example embodiment of the present disclosure, a scan cost parameter is introduced by considering dependence relationships between different data tables, which optimizes the method for evaluating costs of the data tables. As such, in evaluation of the cost of each general data table of the data common layer, instead of taking into account the storage and computation consumption of the current data table in isolation, several upstream data tables and multiple siblings of the data table are also taken into account comprehensively. As such, the processing cost of the general data table may be reasonably and accurately assessed, thus reflecting the advantages and disadvantages of data model construction of the data common layer, and providing decision-making support for the optimization and operation of the models of the data common layer.

Secondly, in the example embodiment of the present disclosure, the measurement of the use cost of the external data table may clearly estimate the consumption in storage, computation and scanning caused by another external data table's access to the general data table of the data common layer, which facilitates evaluating the reasonability and necessity of an external data table's access to the general data table of the data common layer, thus assisting business departments in optimizing construction of their own data tables, avoiding a waste of resources caused by repeated data construction, increasing the utilization of data resources, reducing the data costs, and achieving the objective of saving costs on the whole.

Figure 4:
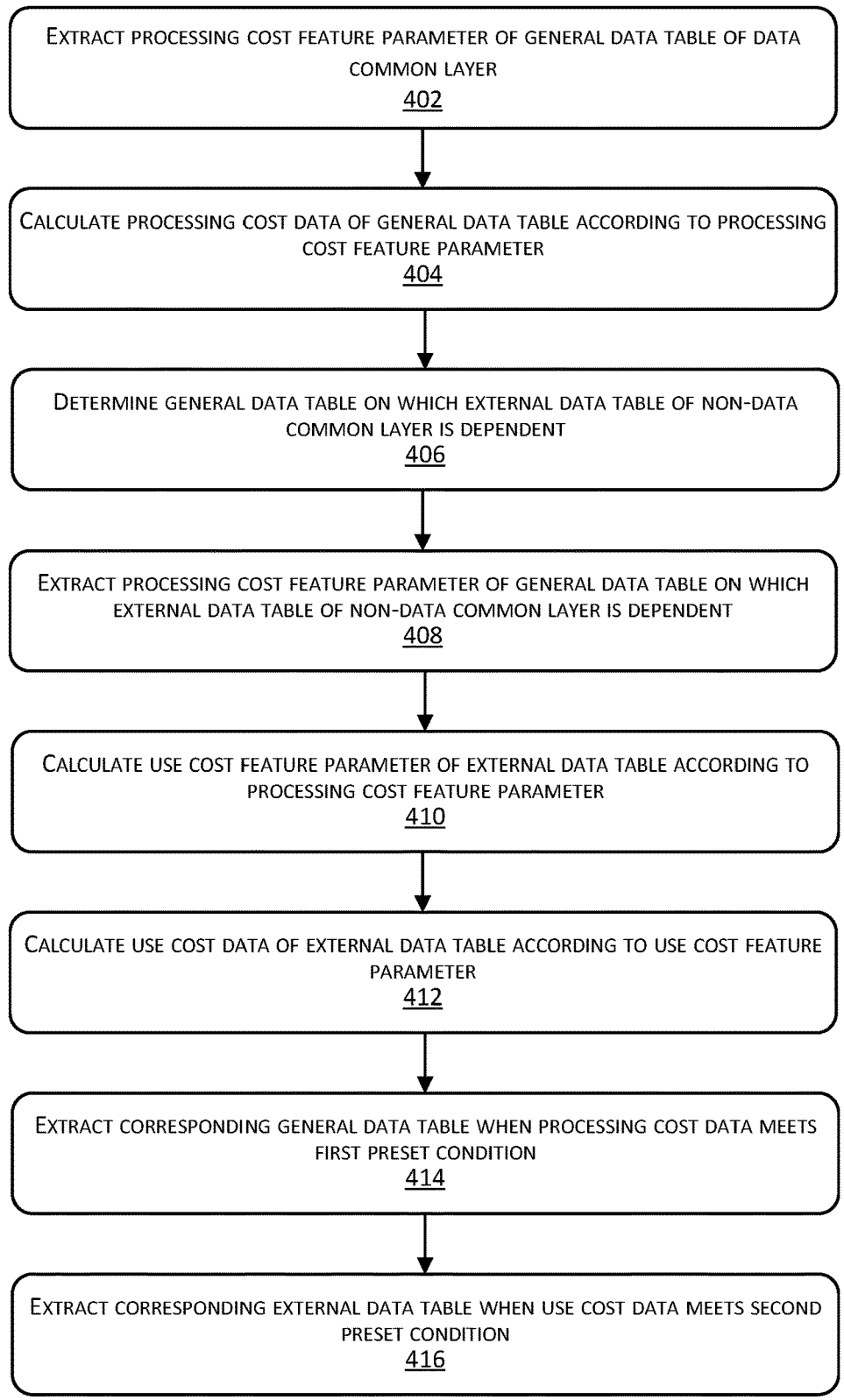
FIG. 4 is a schematic diagram of steps of example embodiment 2 of a method for analyzing a data table according to the present disclosure.

Referring to FIG. 4, a schematic diagram of steps of example embodiment 2 of a method for analyzing a data table according to the present disclosure is shown, wherein the data table may include a general data table of a data common layer and an external data table of a non-data common layer, and the method may include the following steps:

Step 402. A processing cost feature parameter of the general data table of the data common layer is extracted.

In the example embodiment of the present disclosure, the processing cost feature parameter of the general data table may include a first compute cost parameter, a first storage cost parameter and a first scan cost parameter.

The first compute cost parameter may be CPU resources needing to be consumed by the general data table during data processing, and may be calculated with a complexity CU. The first storage cost parameter may be hard disk storage resources needing to be consumed when the general data table is stored, and may be calculated with a storage size TU. The first scan cost parameter reflects a scan size of the general data table with respect to an associated general data table, and may be calculated according to the number of parent tables on which the general data table is dependent, a scan size of the general data table with respect to the parent table and the number of all child tables under the parent table.

In the example embodiment of the present disclosure, in order to uniformly and comprehensively measure the complexity that takes CU as the unit and the storage size that takes TU as the unit, a new resource consumption measurement unit, that is, resource unit denoted as CT, may be introduced. A conversion relation between the resource unit and the complexity CU and a conversion relation between the resource unit and the storage size TU may be 1 CT=4 CU and 1 CT=9 TU.

Step 404. Processing cost data of the general data table is calculated according to the processing cost feature parameter.

In an example implementation, the processing cost data of the general data table may be calculated by using the following formula:

$$\text{Cost}(i) = \text{ComputeCost}(i) + \text{StorageCost}(i) + \sum_{j=1}^{n} \text{ScanCost}(i, j)$$

wherein ComputeCost(i) represents a first compute cost parameter of a general data table i;

StorageCost(i) represents a first storage cost parameter of the general data table i; and ScanCost(i,j) represents a first scan cost parameter of the general data table i with respect to a parent table j.

Step 406. A general data table on which the external data table of the non-data common layer is dependent is determined.

For example, referring to FIG. 3, general data tables on which the external data table D of the non-data common layer is dependent include a general data table B and a general data table C.

Step 408. The processing cost feature parameter of the general data table on which the external data table of the non-data common layer is dependent is extracted.

In an example embodiment of the present disclosure, the use cost feature parameter may include a second compute cost parameter. Therefore, the sub-step of extracting a processing cost feature parameter of the general data table on which the external data table of the non-data common layer is dependent may be: extracting a first compute cost parameter of the general data table on which the external data table is dependent.

In another example embodiment of the present disclosure, the use cost feature parameter may further include a second storage cost parameter. Therefore, the sub-step of extracting a processing cost feature parameter of the general data table on which the external data table of the non-data common layer is dependent may be: extracting a first storage cost parameter of the general data table on which the external data table is dependent.

In yet another example embodiment of the present disclosure, the use cost feature parameter may further include a second scan cost parameter. Therefore, the sub-step of extracting a processing cost feature parameter of the general data table on which the external data table of the non-data common layer is dependent may be: extracting a first scan cost parameter of the general data table on which the external data table is dependent.

For example, refer to FIG. 3, the general data table on which the external data table is dependent is a general data table B and a general data table C. For the second compute cost parameter, the first compute cost parameter of the general data table B and the first compute cost parameter of the general data table C may be extracted respectively. The first compute cost parameter of the general data table B and the first compute cost parameter of the general data table C are both 1 CT. For the second storage cost parameter, the second storage cost parameter of the general data table B and the second storage cost parameter of the general data table C may be extracted respectively. The second storage cost parameter of the general data table B is 1 CT, and the second storage cost parameter of the general data table C is 4 CT. For the second scan cost parameter, the second scan cost parameter of the general data table B and the second scan cost parameter of the general data table C may be extracted respectively. The second scan cost parameter of the general data table B is 3 CT, and the second scan cost parameter of the general data table C is 2 CT.

The foregoing example is merely intended to help understand the example embodiment of the present disclosure and should not be considered as limiting the present disclosure. Those skilled in the art may obtain a corresponding result according to an actual situation by using the method in the example embodiment of the present disclosure.

Step 410. A use cost feature parameter of the external data table is calculated according to the processing cost feature parameter.

In an example embodiment of the present disclosure, the step of calculating a use cost feature parameter of the external data table according to the processing cost feature parameter may include:

acquiring a compute cost calculation factor between the external data table and the general data table on which the external data table is dependent; and correcting the first compute cost parameter according to the compute cost calculation factor to obtain the second compute cost parameter.

The same general data table may be used by many different external data tables. Different users may use the same general data table differently. Some users access a relatively large amount of data, and the computation is relatively complex. Some users only read a small amount of data, and the computation is very simple. If a manner of equal allocation is employed, the scan costs borne by the two kinds of users are the same, which is obviously unfair and unreasonable. Therefore, in the example embodiment of the present disclosure, a compute cost calculation factor is introduced, and the first compute cost parameter is corrected according to the compute cost calculation factor to obtain the second compute cost parameter. The calculation factor reflects a ratio of usage of a parent table by a child table to the overall usage of the parent table in the process that the external data table uses the general data table.

For example, the sub-step of acquiring a compute cost calculation factor between the external data table and the general data table on which the external data table is dependent may further include:

acquiring the number of data tables that have scanned the general data table on each of the last m days and an average child table number of the general data table in the last m days.

For example, the cost calculation factor may be calculated by using the following formula, to obtain the second compute cost parameter:

$$compfac(i, j) = \frac{1}{avg\left(\sum_{m=1}^{90} scan_m(j)\right)}$$

wherein m represents each of the last m days;

$scan_m(j)$ represents the number of data tables that have scanned a general data table j on the $m^{th}$ day; and the denominator is an example of the average child table number of the general data table j in the last 90 days.

In another example embodiment of the present disclosure, the step of calculating a use cost feature parameter of the external data table according to the processing cost feature parameter may further include:

acquiring a storage cost calculation factor between the external data table and the general data table on which the external data table is dependent; and correcting the first storage cost parameter according to the storage cost calculation factor to obtain the second storage cost parameter.

Similar to the calculation of the second compute cost parameter, the second storage cost parameter may also be obtained by correcting the first storage cost parameter according to the storage cost calculation factor.

For example, the sub-step of acquiring a storage cost calculation factor between the external data table and the general data table on which the external data table is dependent may further include:

acquiring a scan size of the external data table with respect to the general data table on which the external data table is dependent and k tables dependent on the general data table.

The storage cost calculation factor may be calculated by using the following formula, to obtain the second storage cost parameter:

$$storfac(i, j) = \frac{scansize(i, j)}{\sum_{m=1}^{k} scansize(m, j)}$$

wherein scansize(i,j) represents a scan size of an external data table i with respect to a general data table j; and m represents k tables dependent on the general data table j, which are numbered 1 . . . k.

In yet another example embodiment of the present disclosure, the step of calculating a use cost feature parameter of the external data table according to the processing cost feature parameter may further include:

acquiring a scan cost calculation factor between the external data table and the general data table on which the external data table is dependent; and correcting the first scan cost parameter according to the storage cost calculation factor to obtain the second scan cost parameter.

Similarly, the second scan cost parameter may also be obtained by acquiring a scan cost calculation factor, determining a ratio that a scan size of a child table with respect to a parent table accounts for in an overall scan size of the parent table and correcting the first scan cost parameter according to the ratio.

For example, the sub-step of acquiring a scan cost calculation factor between the external data table and the general data table on which the external data table is dependent may further include:

acquiring a ratio of a hot field in the general data table and a dependence level of the general data table in the current data common layer.

For any general data table, if the number of times any field a in the table is used by downstream data tables in a time period is greater than the number of direct downstream tables of the general data table, the field a is a hot field of the general data table. Therefore, for any general data table, the ratio of the number of hot fields in the table to the total number of fields in the table is the ratio of the hot field. Typically, the time period for conducting statistical on the hot field may be one day.

The dependence level of the general data table reflects a dependence relationship between the general data table and another general data table in the current data common layer. Referring to FIG. 3, the data common layer includes a total of 3 general data tables, that is, a general data table A, a general data table B and a general data table C. If the dependence level of the general data table A is 1, the dependence levels of the general data table B and the general data table C are both 2.

In an example implementation, a scan cost calculation factor may be calculated by using the following formula, to obtain the second scan cost parameter:

$$scanfac(i, j) = \frac{\text{hot\_ratio}(j)}{\log 2(\text{level}(j) + 1)}$$

wherein hot_ratio(j) represents a ratio that the number of hot fields in a general data table j accounts for in the total number of fields in the table; and level(j) is a dependence level of the general data table j in the data common layer.

Step 412. Use cost data of the external data table is calculated according to the use cost feature parameter.

In the example embodiment of the present disclosure, after the second compute cost parameter, the second storage cost parameter and the second scan cost parameter of the external data table are obtained respectively, the second compute cost parameter, the second storage cost parameter and the second scan cost parameter may be accumulated to obtain the use cost data of the external data table.

In an example implementation, the use cost data of the external data table may be calculated by using the following formula:

$$cost(i,j) = compcost(j)*compfac(i,j) + storcost(j)*storfac(j) + scancost(j)*scanfac(i,j)$$

wherein i represents an external data table, j represents a general data table, and there is a dependence relationship between the data table i and the data table j;

cost(i,j) represents use cost data of the external data table i using the general data table compcost(j) represents a first compute cost parameter in processing cost data of the general data table j;

compfac(i,j) represents a compute cost calculation factor between the external data table i and the general data table j;

storcost(j) represents a first storage cost parameter in the processing cost data of the general data table j;

storfac(i,j) represents a storage cost calculation factor between the external data table i and the general data table j;

scancost(j) represents a first scan cost parameter in the processing cost data of the general data table j; and scanfac(i,j) represents a scan cost calculation factor between the external data table i and the general data table j.

Step 414. The corresponding general data table is extracted when the processing cost data meets a first preset condition.

Step 416. The corresponding external data table is extracted when the use cost data meets a second preset condition.

In an example implementation, after processing cost data of the general data table and use cost data of the external data table are obtained respectively, the general data table and the external data table may be analyzed according to the processing cost data and the use cost data, to determine whether it is necessary to optimize the data table.

In an example embodiment of the present disclosure, the step of extracting the corresponding general data table when the processing cost data meets a first preset condition may include one or more of the following operations:

extracting a general data table if a ratio of a first storage cost parameter of the general data table to a first compute cost parameter of the general data table is higher than a first preset threshold;

extracting a general data table if a first compute cost parameter of the general data table is higher than a second preset threshold;

extracting a general data table if a ratio of a first scan cost parameter of the general data table to a first compute cost parameter of the general data table is higher than a third preset threshold;

counting the sum of second compute cost parameters of external data tables having a direct dependence relationship with a general data table, and extracting the general data table if a first compute cost parameter of the general data table is greater than the sum of the second compute cost parameters;

counting the sum of second storage cost parameters of external data tables having a direct dependence relationship with a general data table, and extracting the general data table if a first storage cost parameter of the general data table is greater than the sum of the second storage cost parameters;

and counting the sum of second scan cost parameters of external data tables having a direct dependence relationship with a general data table, and extracting the general data table if a first scan cost parameter of the general data table is greater than the sum of the second scan cost parameters.

For example, if the ratio of the first storage cost parameter of the general data table to the first compute cost parameter of the general data table is greater than 1/4, it may be considered that the storage cost of the general data table is relatively high. Then, the general data table may be extracted, and it is considered to reduce the storage size.

If the first compute cost parameter of the general data table is more than 30 CU, that is, the CPU operation is more than 30 min, it is possible to consider optimizing the computational logic of the general data table, to reduce the amount of computation.

If the ratio of the first scan cost parameter of the general data table to the first compute cost parameter is greater than 10, it may be considered that the first scan cost parameter is relatively high. Then, it is possible to consider optimizing a processing link of the general data table, to reduce the amount of useless data scanned from the parent table.

In addition, if the first compute cost parameter of the general data table is greater than the sum of compute costs of all users of the general data table, or the first storage cost parameter of the general data table is greater than the sum of storage costs of all users of the general data table, or the first scan cost parameter of the general data table is greater than the sum of scan costs of all users of the general data table, the general data table may be identified and extracted for further processing.

The foregoing example is merely intended to help understand the example embodiment of the present disclosure. Those skilled in the art may determine the value of a corresponding preset threshold, which is not limited in the present disclosure.

In another example embodiment of the present disclosure, the step of extracting the corresponding external data table when the processing cost data meets a second preset condition may include one or more of the following operations:

extracting an external data table if a ratio of a second storage cost parameter of the external data table to a second compute cost parameter of the external data table is higher than a fourth preset threshold; and extracting an external data table if the external data table is capable of obtaining the same data as that in a current general data table from another general data table and a second scan cost parameter of the external data table when acquiring data from the another general data table is less than a second scan cost parameter of the external data table when acquiring data from the current general data table.

For example, if the ratio of the second storage cost parameter of the external data table to the second compute cost parameter is greater than 1/4, it may be considered that the storage cost of the external data table is relatively high. Then, the external data table may be extracted, and it is considered to reduce the storage size.

In addition, if the data on which the external data table is dependent may be obtained from another general data table and the second scan cost parameter when the external data table scans the another general data table is less than the second scan cost parameter when the external data table scans the current general data table, it is possible to consider optimizing the dependence relationship of the external data table, to reduce the scan cost.

The foregoing example is merely intended to help understand the example embodiment of the present disclosure. Those skilled in the art may determine the value of a corresponding preset threshold, which is not limited in the present disclosure.

In the example embodiment of the present disclosure, the cost consumption of an upstream data tables may be inherited by downstream data tables based on reasonable proportions by introducing the calculation factor. At the same time, the use cost of the external data table may be calculated more reasonably and more accurately by comprehensively taking into account factors such as a storage size, a scan size, a reuse degree of the data table, a processing level of the data table and a ratio of hot fields in the data table.

Secondly, in the example embodiment of the present disclosure, processing cost data of the general data table and use cost data of the external data table are analyzed and compared with preset thresholds, so that a data table with excessively high cost consumption may be identified, which is conducive to the optimization of the data table to achieve the objective of saving costs.

To make the foregoing objectives, features and advantages of the present disclosure more comprehensible, an example embodiment of the present disclosure is described in detail in the following with a complete example.

Assume there are six data tables A, B, C, D, E and F, and mutual scan relationships of the six data tables are as shown in the following Table 1:

TABLE 1

| Name of data table | Storage size of data table | Name of scanned data table | Storage size of scanned data table | Scan size | Number of child tables of scanned data tables | Whether it is a general data table or not |
|---|---|---|---|---|---|---|
| B | 10 TB | A | 20 TB | 1 TB | 3 | Y |
| C | 6 TB | B | 10 TB | 2 TB | 2 | Y |
| D | 4 TB | A | 20 TB | 1 TB | 1 | Y |
| E | 12 TB | C | 6 TB | 2 TB | 4 | N |
| F | 2 TB | C | 6 TB | 1 TB | 2 | N |
| A | 20 TB | — | — | — | — | Y |

In Table 1, the data common layer includes 4 general data tables, i.e., a general data table A, a general data table B, a general data table C and a general data table D. There are a total of 2 external data tables of the non-data common layer, i.e., an external data table E and an external data table F.

The first row of data in Table 1 may be interpreted as follows: the storage size of the general data table B is 10 TB, the storage size of the general data table A is 20 TB, and the general data table B scans 1 TB data of the general data table A. There are a total of three child tables under the general data table A.

The second row of data in Table 1 may be interpreted as follows: the storage size of the general data table C is 6 TB, the storage size of the general data table B is 10 TB, and the general data table C scans 2-TB data of the general data table B. There are a total of two child tables under the general data table B.

The fourth row of data in Table 1 may be interpreted as follows: the storage size of the external data table E is 12 TB, the storage size of the general data table C is 6 TB, and the external data table E scans 2-TB data of the general data table C. There are a total of four child tables under the general data table C.

Figure 5:
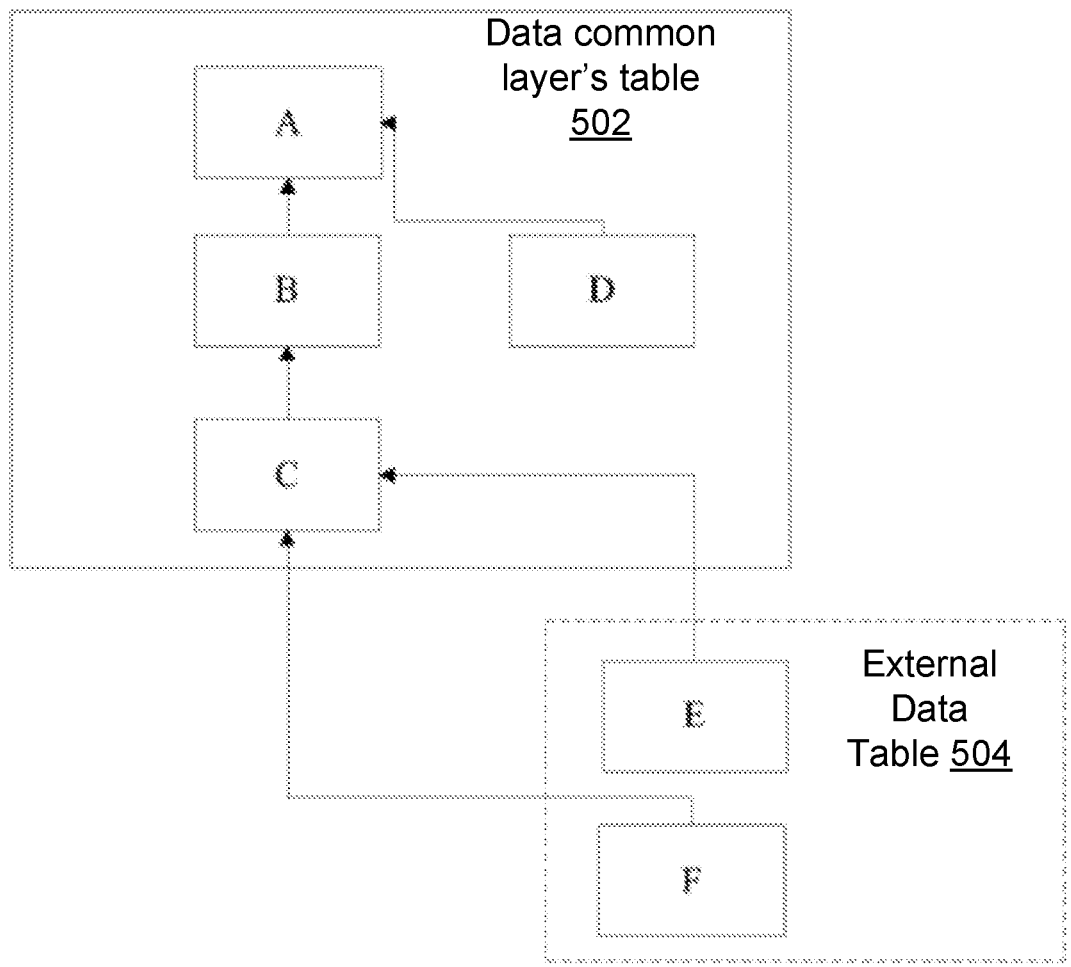
FIG. 5 is another schematic diagram of a relationship between a general data table and an external data table according to the present disclosure.

Another schematic diagram of a relationship between a general data table and an external data table according to the present disclosure as shown in FIG. 5 may be constructed according to the foregoing scanning relationship.

According to the following formula for calculating the processing cost data of the general data table:

$$\text{Cost}(i) = \text{ComputeCost}(i) + \text{StorageCost}(i) + \sum_{j=1}^{n} \text{ScanCost}(i, j)$$

the processing cost data of the general data table of the data common layer or the data common layer's table 502 as shown in the following Table 2 may be obtained:

TABLE 2

| Name of data table | First storage cost parameter | First compute cost parameter | First scan cost parameter |
|---|---|---|---|
| A | 10 | 6 | — |
| B | 5 | 4 | 3 |
| C | 6 | 2 | 1 |
| D | 4 | 3 | 2 |

At the same time, according to the following formula for calculating the use cost data of the external data table:

$$\text{cost}(i,j) = \text{compcost}(j)*\text{compfac}(i,j) + \text{storcost}(j)*\text{storfac}(j) + \text{scancost}(j)*\text{scanfac}(i,j)$$

the use cost data of the external data table 504 as shown in the following Table 3 may be obtained:

TABLE 3

| Name of data table | Second compute cost parameter | Second storage cost parameter | Second scan cost parameter | Name of used general data table | Data scan size | Level of general data table | Heat of general data table | Number of child nodes of general data table |
|---|---|---|---|---|---|---|---|---|
| E | 4 | 4 | 6 | C | 4 TB | 4 | 0.3 | 3 |
| F | 6 | 3 | 4 | C | 2 TB | 4 | 0.3 | 3 |

Then, the processing cost data of the general data table and the use cost data of the external data table are compared with preset conditions, so that a general data table and an external data table as shown in the following Table 4 may be extracted:

TABLE 4

| Name of data table | Compute cost | Problem in computation and solution | Scan cost | Problem in scan cost and solution | Storage cost | Problem in storage and solution | Whether it is a general data table or not |
|---|---|---|---|---|---|---|---|
| B | 4 | It is not more than 30, and there is no problem. | 3 | There is no problem | 5 | The storage size is too large, and it is necessary to confirm with a downstream service user whether the time of data storage may be reduced to reduce generation of unnecessary data. | Y |
| F | 6 | | 4 | If there is a general data table that may provide similar data in the data common layer, consider optimizing the dependence relationship. | 3 | The scan size for the general data table is too large, and it is suggested that only necessary data should be scanned. | N |

The foregoing example is merely intended to help understand the example embodiment of the present disclosure and should not be understood as limiting the present disclosure. Those skilled in the art may determine processing cost data of a general data table and use cost data of an external data table by using the method and the formulas described in the example embodiment of the present disclosure according to actual dependence relationships between data tables, to identify a to-be-optimized data table according to the processing cost data and the use cost data.

It should be noted that, for ease of description, the foregoing method example embodiments are all described as a series of action combinations. However, those skilled in the art should understand that the example embodiments of the present disclosure are not limited to the described sequence of the actions, because some steps may be performed in another sequence or at the same time according to the example embodiments of the present disclosure. In addition, those skilled in the art should also understand that the example embodiments described in this specification all belong to example embodiments, and the involved actions are not necessarily mandatory to the example embodiments of the present disclosure.

Figure 6:
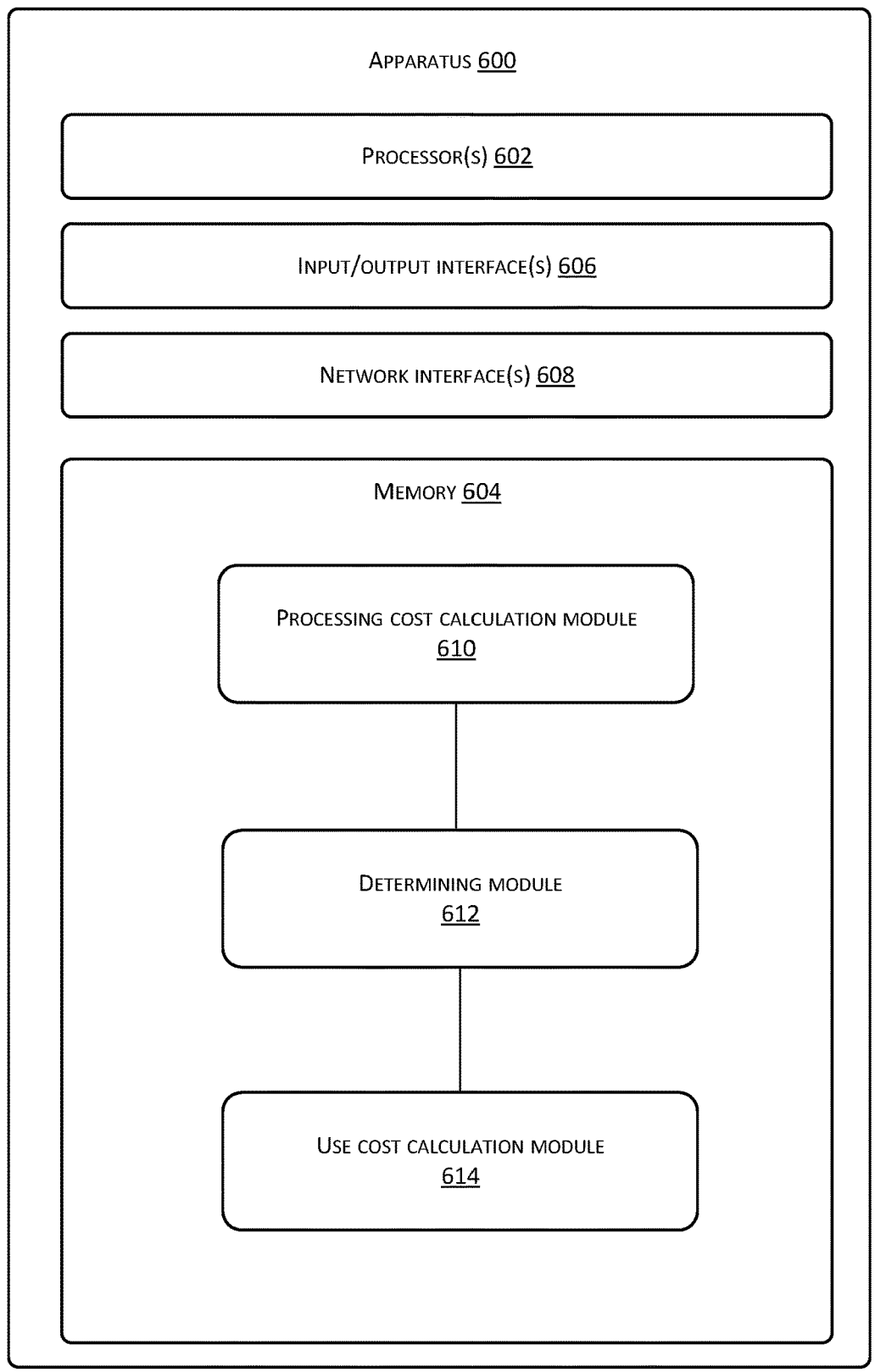
FIG. 6 is a structural block diagram of an example embodiment of an apparatus for analyzing a data table according to the present disclosure.

Referring to FIG. 6, a structural block diagram of an example embodiment of an apparatus 600 for analyzing a data table according to the present disclosure is shown, wherein the data table may include a general data table of a data common layer and an external data table of a non-data common layer.

The apparatus 600 includes one or more processor(s) 602 or data processing unit(s) and memory 604. The apparatus 600 may further include one or more input/output interface(s) 606 and one or more network interface(s) 608. The memory 604 is an example of computer readable media.

The memory 604 may store therein a plurality of modules or units including:

a processing cost calculation module 610 configured to calculate processing cost data of the general data table of the data common layer;

a determining module 612 configured to determine a general data table on which the external data table of the non-data common layer is dependent; and a use cost calculation module 614 configured to calculate use cost data of the external data table according to the processing cost data of the general data table.

In the example embodiment of the present disclosure, the processing cost calculation module 610 may include the following submodules:

a processing cost feature parameter extraction submodule configured to extract a processing cost feature parameter of the general data table of the data common layer; and a processing cost calculation submodule configured to calculate the processing cost data of the general data table according to the processing cost feature parameter.

In an example embodiment of the present disclosure, the processing cost feature parameter may include a first scan cost parameter, and the processing cost feature parameter extraction submodule may further include the following units:

a parent table number counting unit configured to count the number of parent tables on which the general data table is dependent;

a scan size acquiring unit configured to acquire a scan size of the general data table with respect to the parent table; and a child table number counting unit configured to count the number of all child tables under the parent table; and the processing cost calculation submodule may further include the following unit:

a first scan cost calculation unit configured to calculate the first scan cost parameter according to the number of parent tables on which the general data table is dependent, the scan size of the general data table with respect to the parent table and the number of all child tables under the parent table.

In another example embodiment of the present disclosure, the processing cost feature parameter may further include a first compute cost parameter and a first storage cost parameter, and the processing cost feature parameter extraction submodule may further include the following units:

a first compute cost parameter extraction unit configured to extract a complexity CU of the general data table as the first compute cost parameter; and a first storage cost parameter extraction unit configured to extract a storage size of the general data table as the first storage cost parameter.

In the example embodiment of the present disclosure, the first scan cost parameter may be calculated according to the number of parent tables on which the general data table is dependent, the scan size of the general data table with respect to the parent table and the number of all child tables under the parent table by using the following formula:

$$ScanCost(i, j) = Cost(j) * \frac{ScanSize(i, j)}{\sum_{m=1}^{n} ScanSize(m, j)}$$

wherein Cost(j) represents processing cost data of a data table j, the data table j represents m parent tables on which a data table i is dependent, and the m parent tables are numbered 1 . . . m, ScanSize(i,j) represents a scan size of the general data table i with respect to the parent table j, and the data table m represents all child tables of the parent table j, which are numbered 1 . . . n.

In the example embodiment of the present disclosure, the processing cost data of the general data table may be calculated according to the processing cost feature parameter by using the following formula:

$$Cost(i) = ComputeCost(i) + StorageCost(i) + \sum_{j=1}^{n} ScanCost(i, j)$$

wherein ComputeCost(i) represents a first compute cost parameter of a general data table i;

StorageCost(i) is a first storage cost parameter of the general data table i; and ScanCost(i,j) is a first scan cost parameter of the general data table i with respect to a parent table j.

In the example embodiment of the present disclosure, the use cost calculation module 614 may include the following submodule:

a use cost calculation submodule configured to calculate the use cost data of the external data table according to the processing cost feature parameter of the general data table.

In the example embodiment of the present disclosure, the use cost calculation submodule may include the following units:

a processing cost feature parameter extraction unit configured to extract a processing cost feature parameter of the general data table on which the external data table of the non-data common layer is dependent;

a use cost feature parameter calculation unit configured to calculate a use cost feature parameter of the external data table according to the processing cost feature parameter; and a use cost data calculation unit configured to calculate the use cost data of the external data table according to the use cost feature parameter.

In the example embodiment of the present disclosure, the use cost feature parameter includes a second compute cost parameter;

the processing cost feature parameter extraction unit may include the following subunit:

a first compute cost parameter extraction subunit configured to extract a first compute cost parameter of the general data table on which the external data table is dependent; and the use cost feature parameter calculation unit may include the following subunits: a compute cost calculation factor acquiring subunit configured to acquire a compute cost calculation factor between the external data table and the general data table on which the external data table is dependent; and a second compute cost parameter calculation subunit configured to correct the first compute cost parameter according to the compute cost calculation factor to obtain the second compute cost parameter.

In the example embodiment of the present disclosure, the use cost feature parameter may further include a second storage cost parameter;

the processing cost feature parameter extraction unit may include the following subunit:

a first storage cost parameter extraction subunit configured to extract a first storage cost parameter of the general data table on which the external data table is dependent; and the use cost feature parameter calculation unit may include the following subunits: a storage cost calculation factor acquiring subunit configured to acquire a storage cost calculation factor between the external data table and the general data table on which the external data table is dependent; and a second storage cost parameter calculation subunit configured to correct the first storage cost parameter according to the storage cost calculation factor to obtain the second storage cost parameter.

In the example embodiment of the present disclosure, the use cost feature parameter may further include a second scan cost parameter;

the processing cost feature parameter extraction unit may include the following subunit:

a first scan cost parameter extraction subunit configured to extract a first scan cost parameter of the general data table on which the external data table is dependent; and the use cost feature parameter calculation unit may further include the following subunits:

a scan cost calculation factor acquiring subunit configured to acquire a scan cost calculation factor between the external data table and the general data table on which the external data table is dependent; and a second scan cost parameter calculation subunit configured to correct the first scan cost parameter according to the storage cost calculation factor to obtain the second scan cost parameter.

In the example embodiment of the present disclosure, the compute cost calculation factor acquiring subunit may be further configured to:

acquire the number of data tables that have scanned the general data table on each of the last m days and an average child table number of the general data table in the last m days; and calculate the cost calculation factor according to the number of data tables that have scanned the general data table on each of the last m days and the average child table number of the general data table in the last m days by using the following formula:

$$compfac(i, j) = \frac{1}{avg\left(\sum_{m=1}^{90} scan_m(j)\right)}$$

wherein m represents each of the last m days;

$scan_m(j)$ represents the number of data tables that have scanned a general data table j on the $m^{th}$ day; and the denominator is an example of the average child table number of the general data table j in the last 90 days.

In the example embodiment of the present disclosure, the storage cost calculation factor acquiring subunit may be further configured to:

acquire a scan size of the external data table with respect to the general data table on which the external data table is dependent and k tables dependent on the general data table; and calculate the storage cost calculation factor according to the scan size of the external data table with respect to the general data table on which the external data table is dependent and the k tables dependent on the general data table by using the following formula:

$$storfac(i, j) = \frac{scansize(i, j)}{\sum_{m=1}^{k} scansize(m, j)}$$

wherein scansize(i,j) represents a scan size of an external data table i with respect to a general data table j; and m represents k tables dependent on the general data table j, which are numbered 1 . . . k.

In the example embodiment of the present disclosure, the scan cost calculation factor acquiring subunit may be further configured to:

acquire a ratio of a hot field in the general data table and a dependence level of the general data table in a current data common layer, the hot field being such a field: the number of times the hot field is used in a time period is greater than the number of direct downstream data tables of the general data table; and calculate the scan cost calculation factor according to the ratio of the hot field in the general data table and the dependence level of the general data table in the current data common layer by using the following formula:

$$scanfac(i, j) = \frac{hot\_ratio(j)}{\log 2(level(j) + 1)}$$

wherein hot_ratio(j) represents a ratio that the number of hot fields in a general data table j accounts for in the total number of fields in the table; and level(j) represents a dependence level of the general data table j in the data common layer.

In the example embodiment of the present disclosure, the use cost data of the external data table may be calculated according to the use cost feature parameter by using the following formula:

$$cost(i,j) = compcost(j)*compfac(i,j) + storcost(j)*storfac(i,j) + scancost(j)*scanfac(i,j)$$

wherein i represents an external data table, j represents a general data table, and there is a dependence relationship between the data table i and the data table j;

cost(i,j) represents use cost data of the external data table i using the general data table j;

compcost(j) represents a first compute cost parameter in processing cost data of the general data table j;

compfac(i,j) represents a compute cost calculation factor between the external data table i and the general data table j;

storcost(j) represents a first storage cost parameter in the processing cost data of the general data table j;

storfac(i,j) represents a storage cost calculation factor between the external data table i and the general data table j;

scancost(j) represents a first scan cost parameter in the processing cost data of the general data table j; and scanfac(i,j) represents a scan cost calculation factor between the external data table i and the general data table j.

In the example embodiment of the present disclosure, the apparatus 600 may further include the following module (not shown in FIG. 6):

a first extraction module configured to extract the corresponding general data table when the processing cost data meets a first preset condition.

In the example embodiment of the present disclosure, the first extraction module may include one or more of the following submodules:

a first extraction submodule configured to extract a general data table if a ratio of a first storage cost parameter of the general data table to a first compute cost parameter of the general data table is higher than a first preset threshold;

a second extraction submodule configured to extract a general data table if a first compute cost parameter of the general data table is higher than a second preset threshold;

a third extraction submodule configured to extract a general data table if a ratio of a first scan cost parameter of the general data table to a first compute cost parameter of the general data table is higher than a third preset threshold;

a fourth counting submodule configured to count the sum of second compute cost parameters of external data tables having a direct dependence relationship with a general data table, and a fourth extraction submodule configured to extract the general data table if a first compute cost parameter of the general data table is greater than the sum of the second compute cost parameters;

a fifth counting submodule configured to count the sum of second storage cost parameters of external data tables having a direct dependence relationship with a general data table, and a fifth extraction submodule configured to extract the general data table if a first storage cost parameter of the general data table is greater than the sum of the second storage cost parameters; and a sixth counting submodule configured to count the sum of second scan cost parameters of external data tables having a direct dependence relationship with a general data table, and a sixth extraction submodule configured to extract the general data table if a first scan cost parameter of the general data table is greater than the sum of the second scan cost parameters.

In the example embodiment of the present disclosure, the apparatus 600 may further include the following module (not shown in FIG. 6):

a second extraction module configured to extract the corresponding external data table when the use cost data meets a second preset condition.

In the example embodiment of the present disclosure, the second extraction module may include one or more of the following submodules:

a seventh extraction submodule configured to extract an external data table if a ratio of a second storage cost parameter of the external data table to a second compute cost parameter of the external data table is higher than a fourth preset threshold; and an eighth extraction submodule configured to extract an external data table if the external data table is capable of obtaining the same data as that in a current general data table from another general data table and a second scan cost parameter of the external data table when acquiring data from the another general data table is less than a second scan cost parameter of the external data table when acquiring data from the current general data table.

The apparatus example embodiment is basically similar to the method example embodiment, so that it is described simply. For related parts, refer to the descriptions of the parts in the method example embodiment.

The example embodiments in this specification are all described in a progressive manner, each example embodiment emphasizes a part different from other example embodiments, and identical or similar parts in the example embodiments may be obtained with reference to each other.

Those skilled in the art should understand that the example embodiments may be provided as a method, an apparatus, or a computer program product. Therefore, the example embodiments of the present disclosure may be implemented in the form of a complete hardware example embodiment, a complete software example embodiment, or an example embodiment combining software and hardware. Moreover, the example embodiments of the present disclosure may be in the form of a computer program product implemented on one or more computer usable storage media (including, but not limited to, a magnetic disk memory, a CD-ROM, an optical memory, and the like) including computer usable program codes.

In a typical configuration, the computer device includes one or more processors (CPUs), an input/output interface, a network interface, and a memory. The memory may include a volatile memory, a random access memory (RAM) and/or a non-volatile memory or the like in a computer readable medium, for example, a read-only memory (ROM) or a flash RAM. The memory is an example of the computer readable medium. The computer readable medium includes non-volatile and volatile media as well as movable and non-movable media, and may implement information storage by means of any method or technology. Information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and may be used to store information accessible to the computing device. According to the definition herein, the computer readable medium does not include transitory media, such as modulated data signals and carriers.

The example embodiments of the present disclosure are described with reference to flowcharts and/or block diagrams according to the method, the terminal device (system) and the computer program product of the example embodiments of the present disclosure. It should be understood that a computer program instruction may be used to implement each process and/or block in the flowcharts and/or block diagrams and combinations of processes and/or blocks in the flowcharts and/or block diagrams. The computer program instructions may be provided to a universal computer, a dedicated computer, an embedded processor or a processor of another programmable data processing terminal device to generate a machine, such that the computer or the processor of another programmable data processing terminal device executes the instructions to generate an apparatus configured to implement functions designated in one or more processes in a flowchart and/or one or more blocks in a block diagram.

The computer program instructions may also be stored in a computer readable storage that may guide the computer or another programmable data processing terminal device to work in an example manner, such that the instructions stored in the computer readable storage generate an article of manufacture including an instruction apparatus, and the instruction apparatus implements functions designated by one or more processes in a flowchart and/or one or more blocks in a block diagram.

The computer program instructions may also be installed in the computer or another programmable data processing terminal device, such that a series of operation steps are executed on the computer or another programmable terminal device to generate computer-implemented processing. Therefore, the instructions executed in the computer or another programmable terminal device provide steps for implementing functions designated in one or more processes in a flowchart and/or one or more blocks in a block diagram.

Example embodiments of the present disclosure have been described; however, once knowing basic creative concepts, those skilled in the art may make other variations and modifications to the example embodiments. Therefore, the appended claims are intended to be explained as including the example embodiments and all variations and modifications falling within the scope of the example embodiments of the present disclosure.

Finally, it should be further noted that, in this text, the relation terms such as first and second are merely used to distinguish one entity or operation from another entity or operation, and do not require or imply that the entities or operations should have such an actual relation or order. Moreover, the terms "include", "comprise" or other variations thereof are intended to cover non-exclusive inclusion, so that a process, method, article or terminal device including a series of elements not only includes the elements, but also includes other elements not clearly listed, or further includes inherent elements of the process, method, article or terminal device. In the absence of more limitations, an element defined by "including a/an . . . " does not exclude that the process, method, article or terminal device including the element further has other identical elements.

A method for analyzing a data table and an apparatus for analyzing a data table provided in the present disclosure are described in detail above, and the principles and implementation manners of the present disclosure are described by using examples in this text. The above descriptions about the example embodiments are merely used to help understand the method of the present disclosure and its core idea. At the same time, for those of ordinary skill in the art, there may be modifications to the example implementations and the application scope according to the idea of the present disclosure. Therefore, the content of the specification should not be construed as limiting the present disclosure.

The present disclosure may further be understood with clauses as follows.

Clause 1. A method for analyzing a data table, wherein the data table comprises a general data table of a data common layer and an external data table of a non-data common layer, the method comprising:

calculating processing cost data of the general data table of the data common layer;

determining a general data table on which the external data table of the non-data common layer is dependent; and calculating use cost data of the external data table according to the processing cost data of the general data table.

Clause 2. The method of clause 1, wherein the step of calculating processing cost data of the general data table of the data common layer comprises:

extracting a processing cost feature parameter of the general data table of the data common layer; and calculating the processing cost data of the general data table according to the processing cost feature parameter.

Clause 3. The method of clause 2, wherein the processing cost feature parameter comprises a first scan cost parameter, and the sub-step of extracting a processing cost feature parameter of the general data table of the data common layer further comprises:

counting the number of parent tables on which the general data table is dependent;

acquiring a scan size of the general data table with respect to the parent table; and counting the number of all child tables under the parent table; and the sub-step of calculating the processing cost data of the general data table according to the processing cost feature parameter further comprises:

calculating the first scan cost parameter according to the number of parent tables on which the general data table is dependent, the scan size of the general data table with respect to the parent table and the number of all child tables under the parent table.

Clause 4. The method of clause 3, wherein the processing cost feature parameter further comprises a first compute cost parameter and a first storage cost parameter, and the sub-step of extracting a processing cost feature parameter of the general data table of the data common layer further comprises:

extracting a complexity CU of the general data table as the first compute cost parameter; and extracting a storage size of the general data table as the first storage cost parameter.

Clause 5. The method of clause 3 or 4, wherein the first scan cost parameter is calculated according to the number of parent tables on which the general data table is dependent, the scan size of the general data table with respect to the parent table and the number of all child tables under the parent table by using the following formula:

$$ScanCost(i, j) = Cost(j) * \frac{ScanSize(i, j)}{\sum_{m=1}^{n} ScanSize(m, j)}$$

wherein:

Cost(j) represents processing cost data of a data table j, the data table j represents m parent tables on which a data table i is dependent, and the m parent tables are numbered 1 . . . m;

ScanSize(i,j) represents a scan size of the general data table i with respect to the parent table j; and the data table m represents all child tables of the parent table j, which are numbered 1 . . . n.

Clause 6. The method of clause 5, wherein the processing cost data of the general data table is calculated according to the processing cost feature parameter by using the following formula:

$$Cost(i) = ComputeCost(i) + StorageCost(i) + \sum_{j=1}^{n} ScanCost(i, j)$$

wherein:

ComputeCost(i) represents a first compute cost parameter of a general data table i;

StorageCost(i) represents a first storage cost parameter of the general data table i; and ScanCost(i,j) represents a first scan cost parameter of the general data table i with respect to a parent table j.

Clause 7. The method of clause 2 or 3 or 4, wherein the step of calculating use cost data of the external data table according to the processing cost data of the general data table is:

calculating the use cost data of the external data table according to the processing cost feature parameter of the general data table.

Clause 8. The method of clause 7, wherein the step of calculating the use cost data of the external data table according to the processing cost feature parameter of the general data table comprises:

extracting a processing cost feature parameter of the general data table on which the external data table of the non-data common layer is dependent;

calculating a use cost feature parameter of the external data table according to the processing cost feature parameter; and calculating the use cost data of the external data table according to the use cost feature parameter.

Clause 9. The method of clause 8, wherein the use cost feature parameter comprises a second compute cost parameter;

the sub-step of extracting a processing cost feature parameter of the general data table on which the external data table of the non-data common layer is dependent is:

extracting a first compute cost parameter of the general data table on which the external data table is dependent; and the step of calculating a use cost feature parameter of the external data table according to the processing cost feature parameter further comprises:

acquiring a compute cost calculation factor between the external data table and the general data table on which the external data table is dependent; and correcting the first compute cost parameter according to the compute cost calculation factor to obtain the second compute cost parameter.

Clause 10. The method of clause 9, wherein the use cost feature parameter comprises a second storage cost parameter;

the sub-step of extracting a processing cost feature parameter of the general data table on which the external data table of the non-data common layer is dependent is:

extracting a first storage cost parameter of the general data table on which the external data table is dependent; and the step of calculating a use cost feature parameter of the external data table according to the processing cost feature parameter further comprises:

acquiring a storage cost calculation factor between the external data table and the general data table on which the external data table is dependent; and correcting the first storage cost parameter according to the storage cost calculation factor to obtain the second storage cost parameter.

Clause 11. The method of clause 10, wherein the use cost feature parameter comprises a second scan cost parameter;

the sub-step of extracting a processing cost feature parameter of the general data table on which the external data table of the non-data common layer is dependent is:

extracting a first scan cost parameter of the general data table on which the external data table is dependent; and the step of calculating a use cost feature parameter of the external data table according to the processing cost feature parameter further comprises:

acquiring a scan cost calculation factor between the external data table and the general data table on which the external data table is dependent; and correcting the first scan cost parameter according to the storage cost calculation factor to obtain the second scan cost parameter.

Clause 12. The method of clause 9, wherein the sub-step of acquiring a compute cost calculation factor between the external data table and the general data table on which the external data table is dependent further comprises:

acquiring the number of data tables that have scanned the general data table on each of the last m days and an average child table number of the general data table in the last m days; and calculating the cost calculation factor according to the number of data tables that have scanned the general data table on each of the last m days and the average child table number of the general data table in the last m days by using the following formula:

$$compfac(i, j) = \frac{1}{avg\left(\sum_{m=1}^{90} scan_m(j)\right)}$$

wherein:

m represents each of the last m days;

$scan_m(j)$ represents the number of data tables that have scanned a general data table j on the $m^{th}$ day; and the denominator represents an example of the average child table number of the general data table j in the last 90 days.

Clause 13. The method of clause 10, wherein the sub-step of acquiring a storage cost calculation factor between the external data table and the general data table on which the external data table is dependent further comprises:

acquiring a scan size of the external data table with respect to the general data table on which the external data table is dependent and k tables dependent on the general data table; and calculating the storage cost calculation factor according to the scan size of the external data table with respect to the general data table on which the external data table is dependent and the k tables dependent on the general data table by using the following formula:

$$storfac(i, j) = \frac{scansize(i, j)}{\sum_{m=1}^{k} scansize(m, j)}$$

wherein:

scansize(i,j) represents a scan size of an external data table i with respect to a general data table j; and m represents k tables dependent on the general data table j, which are numbered 1 ... k.

Clause 14. The method of clause 11, wherein the sub-step of acquiring a scan cost calculation factor between the external data table and the general data table on which the external data table is dependent further comprises:

acquiring a ratio of a hot field in the general data table and a dependence level of the general data table in the current data common layer, the hot field being such a field: the number of times the hot field is used in a time period is greater than the number of direct downstream data tables of the general data table; and calculating the scan cost calculation factor according to the ratio of the hot field in the general data table and the dependence level of the general data table in the current data common layer by using the following formula:

$$scanfac(i, j) = \frac{hot\_ratio(j)}{\log 2(level(j) + 1)}$$

wherein:

hot_ratio(j) represents a ratio that the number of hot fields in a general data table j accounts for in the total number of fields in the table; and level(j) represents a dependence level of the general data table j in the data common layer.

Clause 15. The method of clause 12 or 13 or 14, wherein the use cost data of the external data table is calculated according to the use cost feature parameter by using the following formula:

cost(i,j)=compcost(j)*compfac(i,j)+storcost(j)*storfac(j)+scancost(j)*scanfac(i,j)

wherein:

i represents an external data table, j represents a general data table, and there is a dependence relationship between the data table i and the data table j;

cost(i,j) represents use cost data of the external data table i using the general data table compcost(j) represents a first compute cost parameter in processing cost data of the general data table j;

compfac(i,j) represents a compute cost calculation factor between the external data table i and the general data table j;

storcost(j) represents a first storage cost parameter in the processing cost data of the general data table j;

storfac(i,j) represents a storage cost calculation factor between the external data table i and the general data table j;

scancost(j) represents a first scan cost parameter in the processing cost data of the general data table j; and scanfac(i,j) represents a scan cost calculation factor between the external data table i and the general data table j.

Clause 16. The method of clause 1 or 2 or 3 or 4 or 6 or 8 or 9 or 10 or 11 or 12 or 13 or 14, further comprising:

extracting the corresponding general data table when the processing cost data meets a first preset condition.

Clause 17. The method of clause 16, wherein the step of extracting the corresponding general data table when the processing cost data meets a first preset condition comprises one or more of the following:

extracting a general data table if a ratio of a first storage cost parameter of the general data table to a first compute cost parameter of the general data table is higher than a first preset threshold;

extracting a general data table if a first compute cost parameter of the general data table is higher than a second preset threshold;

extracting a general data table if a ratio of a first scan cost parameter of the general data table to a first compute cost parameter of the general data table is higher than a third preset threshold;

counting the sum of second compute cost parameters of external data tables having a direct dependence relationship with a general data table, and extracting the general data table if a first compute cost parameter of the general data table is greater than the sum of the second compute cost parameters;

counting the sum of second storage cost parameters of external data tables having a direct dependence relationship with a general data table, and extracting the general data table if a first storage cost parameter of the general data table is greater than the sum of the second storage cost parameters;

and counting the sum of second scan cost parameters of external data tables having a direct dependence relationship with a general data table, and extracting the general data table if a first scan cost parameter of the general data table is greater than the sum of the second scan cost parameters.

Clause 18. The method of clause 1 or 2 or 3 or 4 or 6 or 8 or 9 or 10 or 11 or 12 or 13 or 14 or 17, further comprising:

extracting the corresponding external data table when the use cost data meets a second preset condition.

Clause 19. The method of clause 18, wherein the step of extracting the corresponding external data table when the processing cost data meets a second preset condition comprises one or more of the following:

extracting an external data table if a ratio of a second storage cost parameter of the external data table to a second compute cost parameter of the external data table is higher than a fourth preset threshold;

and extracting an external data table if the external data table is capable of obtaining the same data as that in a current general data table from another general data table and a second scan cost parameter of the external data table when acquiring data from the another general data table is less than a second scan cost parameter of the external data table when acquiring data from the current general data table.

Clause 20. An apparatus for analyzing a data table, wherein the data table comprises a general data table of a data common layer and an external data table of a non-data common layer, the apparatus comprising:

a processing cost calculation module configured to calculate processing cost data of the general data table of the data common layer;

a determining module configured to determine a general data table on which the external data table of the non-data common layer is dependent; and a use cost calculation module configured to calculate use cost data of the external data table according to the processing cost data of the general data table.

Clause 21. The apparatus of clause 20, wherein the processing cost calculation module comprises:

a processing cost feature parameter extraction submodule configured to extract a processing cost feature parameter of the general data table of the data common layer; and a processing cost calculation submodule configured to calculate the processing cost data of the general data table according to the processing cost feature parameter.

Clause 22. The apparatus of clause 21, wherein the processing cost feature parameter comprises a first scan cost parameter, and the processing cost feature parameter extraction submodule further comprises:

a parent table number counting unit configured to count the number of parent tables on which the general data table is dependent;

a scan size acquiring unit configured to acquire a scan size of the general data table with respect to the parent table; and a child table number counting unit configured to count the number of all child tables under the parent table; and the processing cost calculation submodule further comprises:

a first scan cost calculation unit configured to calculate the first scan cost parameter according to the number of parent tables on which the general data table is dependent, the scan size of the general data table with respect to the parent table and the number of all child tables under the parent table.

Clause 23. The apparatus of clause 22, wherein the processing cost feature parameter further comprises a first compute cost parameter and a first storage cost parameter, and the processing cost feature parameter extraction submodule further comprises:

a first compute cost parameter extraction unit configured to extract a complexity CU of the general data table as the first compute cost parameter; and a first storage cost parameter extraction unit configured to extract a storage size of the general data table as the first storage cost parameter.

Clause 24. The apparatus of clause 22 or 23, wherein the first scan cost parameter is calculated according to the number of parent tables on which the general data table is dependent, the scan size of the general data table with respect to the parent table and the number of all child tables under the parent table by using the following formula:

$$ScanCost(i, j) = Cost(j) * \frac{ScanSize(i, j)}{\sum_{m=1}^{n} ScanSize(m, j)}$$

wherein:

Cost(j) represents processing cost data of a data table j;

the data table j represents m parent tables on which a data table i is dependent, and the m parent tables are numbered 1 . . . m;

ScanSize(i,j) represents a scan size of the general data table i with respect to the parent table j; and the data table m represents all child tables of the parent table j, which are numbered 1 . . . n.

Clause 25. The apparatus of clause 24, wherein the processing cost data of the general data table is calculated according to the processing cost feature parameter by using the following formula:

$$Cost(i) = ComputeCost(i) + StorageCost(i) + \sum_{j=1}^{n} ScanCost(i, j)$$

wherein:

ComputeCost(i) represents a first compute cost parameter of a general data table i;

StorageCost(i) represents a first storage cost parameter of the general data table i; and ScanCost(i,j) represents a first scan cost parameter of the general data table i with respect to a parent table j.

Clause 26. The apparatus of clause 21 or 22 or 23, wherein the use cost calculation module comprises:

a use cost calculation submodule configured to calculate the use cost data of the external data table according to the processing cost feature parameter of the general data table.

Clause 27. The apparatus of clause 26, wherein the use cost calculation submodule comprises:

a processing cost feature parameter extraction unit configured to extract a processing cost feature parameter of the general data table on which the external data table of the non-data common layer is dependent;

a use cost feature parameter calculation unit configured to calculate a use cost feature parameter of the external data table according to the processing cost feature parameter; and a use cost data calculation unit configured to calculate the use cost data of the external data table according to the use cost feature parameter.

Clause 28. The apparatus of clause 27, wherein the use cost feature parameter comprises a second compute cost parameter;

the processing cost feature parameter extraction unit comprises:

a first compute cost parameter extraction subunit configured to extract a first compute cost parameter of the general data table on which the external data table is dependent; and the use cost feature parameter calculation unit comprises:

a compute cost calculation factor acquiring subunit configured to acquire a compute cost calculation factor between the external data table and the general data table on which the external data table is dependent; and a second compute cost parameter calculation subunit configured to correct the first compute cost parameter according to the compute cost calculation factor to obtain the second compute cost parameter.

Clause 29. The apparatus of clause 28, wherein the use cost feature parameter comprises a second storage cost parameter;

the processing cost feature parameter extraction unit comprises:

a first storage cost parameter extraction subunit configured to extract a first storage cost parameter of the general data table on which the external data table is dependent; and the use cost feature parameter calculation unit further comprises:

a storage cost calculation factor acquiring subunit configured to acquire a storage cost calculation factor between the external data table and the general data table on which the external data table is dependent; and a second storage cost parameter calculation subunit configured to correct the first storage cost parameter according to the storage cost calculation factor to obtain the second storage cost parameter.

Clause 30. The apparatus of clause 29, wherein the use cost feature parameter comprises a second scan cost parameter;

the processing cost feature parameter extraction unit comprises:

a first scan cost parameter extraction subunit configured to extract a first scan cost parameter of the general data table on which the external data table is dependent; and the use cost feature parameter calculation unit further comprises:

a scan cost calculation factor acquiring subunit configured to acquire a scan cost calculation factor between the external data table and the general data table on which the external data table is dependent; and a second scan cost parameter calculation subunit configured to correct the first scan cost parameter according to the storage cost calculation factor to obtain the second scan cost parameter.

Clause 31. The apparatus of clause 28, wherein the compute cost calculation factor acquiring subunit is further configured to:

acquire the number of data tables that have scanned the general data table on each of the last m days and an average child table number of the general data table in the last m days; and calculate the cost calculation factor according to the number of data tables that have scanned the general data table on each of the last m days and the average child table number of the general data table in the last m days by using the following formula:

$$compfac(i, j) = \frac{1}{avg\left(\sum_{m=1}^{90} scan_m(j)\right)}$$

wherein:

m represents each of the last m days;

$scan_m(j)$ represents the number of data tables that have scanned a general data table j on the $m^{th}$ day; and the denominator represents an example of the average child table number of the general data table j in the last 90 days.

Clause 32. The apparatus of clause 29, wherein the storage cost calculation factor acquiring subunit is further configured to:

acquire a scan size of the external data table with respect to the general data table on which the external data table is dependent and k tables dependent on the general data table; and calculate the storage cost calculation factor according to the scan size of the external data table with respect to the general data table on which the external data table is dependent and the k tables dependent on the general data table by using the following formula:

$$storfac(i, j) = \frac{scansize(i, j)}{\sum_{m=1}^{k} scansize(m, j)}$$

wherein:

scansize(i,j) represents a scan size of an external data table i with respect to a general data table j; and m represents k tables dependent on the general data table j, which are numbered 1 . . . k.

Clause 33. The apparatus of clause 30, wherein the scan cost calculation factor acquiring subunit is further configured to:

acquire a ratio of a hot field in the general data table and a dependence level of the general data table in the current data common layer, the hot field being such a field: the number of times the hot field is used in a time period is greater than the number of direct downstream data tables of the general data table; and calculate the scan cost calculation factor according to the ratio of the hot field in the general data table and the dependence level of the general data table in the current data common layer by using the following formula:

$$scanfac(i, j) = \frac{\text{hot\_ratio}(j)}{\log 2(\text{level}(j) + 1)}$$

wherein:

hot_ratio(j) represents a ratio that the number of hot fields in a general data table j accounts for in the total number of fields in the table; and level(j) represents a dependence level of the general data table j in the data common layer.

Clause 34. The apparatus of clause 31 or 32 or 33, wherein the use cost data of the external data table is calculated according to the use cost feature parameter by using the following formula:

$$cost(i,j)=compcost(j)*compfac(i,j)+storcost(j)*storfac(j)+scancost(j)*scanfac(i,j)$$

wherein:

i represents an external data table, j represents a general data table, and there is a dependence relationship between the data table i and the data table j;

cost(i,j) represents use cost data of the external data table i using the general data table compcost(j) represents a first compute cost parameter in processing cost data of the general data table j;

compfac(i,j) represents a compute cost calculation factor between the external data table i and the general data table j;

storcost(j) represents a first storage cost parameter in the processing cost data of the general data table j;

storfac(i,j) represents a storage cost calculation factor between the external data table i and the general data table j;

scancost(j) represents a first scan cost parameter in the processing cost data of the general data table j; and scanfac(i,j) represents a scan cost calculation factor between the external data table i and the general data table j.

Clause 35. The apparatus of clause 20 or 21 or 22 or 23 or 25 or 27 or 28 or 29 or 30 or 31 or 32 or 33, further comprising:

a first extraction module configured to extract the corresponding general data table when the processing cost data meets a first preset condition.

Clause 36. The apparatus of clause 35, wherein the first extraction module comprises one or more of the following submodules:

a first extraction submodule configured to extract a general data table if a ratio of a first storage cost parameter of the general data table to a first compute cost parameter of the general data table is higher than a first preset threshold;

a second extraction submodule configured to extract a general data table if a first compute cost parameter of the general data table is higher than a second preset threshold;

a third extraction submodule configured to extract a general data table if a ratio of a first scan cost parameter of the general data table to a first compute cost parameter of the general data table is higher than a third preset threshold;

a fourth counting submodule configured to count the sum of second compute cost parameters of external data tables having a direct dependence relationship with a general data table, and a fourth extraction submodule configured to extract the general data table if a first compute cost parameter of the general data table is greater than the sum of the second compute cost parameters;

a fifth counting submodule configured to count the sum of second storage cost parameters of external data tables having a direct dependence relationship with a general data table, and a fifth extraction submodule configured to extract the general data table if a first storage cost parameter of the general data table is greater than the sum of the second storage cost parameters; and a sixth counting submodule configured to count the sum of second scan cost parameters of external data tables having a direct dependence relationship with a general data table, and a sixth extraction submodule configured to extract the general data table if a first scan cost parameter of the general data table is greater than the sum of the second scan cost parameters.

Clause 37. The apparatus of clause 20 or 21 or 22 or 23 or 25 or 27 or 28 or 29 or 30 or 31 or 32 or 33 or 36, further comprising:

a second extraction module configured to extract the corresponding external data table when the use cost data meets a second preset condition.

Clause 38. The apparatus of clause 37, wherein the second extraction module comprises one or more of the following submodules:

a seventh extraction submodule configured to extract an external data table if a ratio of a second storage cost parameter of the external data table to a second compute cost parameter of the external data table is higher than a fourth preset threshold; and an eighth extraction submodule configured to extract an external data table if the external data table is capable of obtaining the same data as that in a current general data table from another general data table and a second scan cost parameter of the external data table when acquiring data from the another general data table is less than a second scan cost parameter of the external data table when acquiring data from the current general data table.

What is claimed is:

1. A method comprising:
calculating processing cost data of a general data table of a data common layer;
determining a general data table on which an external data table of a non-data common layer is dependent; and
calculating use cost data of the external data table according to the processing cost data of the determined general data table.

2. The method of claim 1, wherein the calculating the processing cost data of the general data table of the data common layer includes:
extracting a processing cost feature parameter of the general data table of the data common layer; and
calculating the processing cost data of the general data table according to the processing cost feature parameter.

3. The method of claim 2, wherein:
the processing cost feature parameter includes a first scan cost parameter; and
the extracting the processing cost feature parameter of the general data table of the data common layer includes:
counting a number of parent tables on which the general data table is dependent;
acquiring a scan size of the general data table with respect to the parent tables; and
counting a number of child tables under the parent tables.

4. The method of claim 3, wherein:
the calculating the processing cost data of the general data table according to the processing cost feature parameter includes:
calculating the first scan cost parameter according to the number of parent tables on which the general data table is dependent, the scan size of the general data table with respect to the parent tables and the number of the child tables under the parent tables.

5. The method of claim 4, wherein:
the processing cost feature parameter further includes a first compute cost parameter and a first storage cost parameter; and
the extracting the processing cost feature parameter of the general data table of the data common layer includes:
extracting a complexity CU of the general data table as the first compute cost parameter; and
extracting a storage size of the general data table as the first storage cost parameter.

6. The method of claim 5, wherein one CU represents cost consumption needed by one CPU (core) for one day.

7. The method of claim 5, wherein the complexity CU is acquired from a large-scale distributed data processing service.

8. The method of claim 2, wherein the calculating the use cost data of the external data table according to the processing cost data of the general data table includes:
calculating the use cost data of the external data table according to the processing cost feature parameter of the general data table.

9. The method of claim 8, wherein the calculating the use cost data of the external data table according to the processing cost feature parameter of the general data table includes:
extracting a processing cost feature parameter of the general data table on which the external data table of the non-data common layer is dependent;
calculating a use cost feature parameter of the external data table according to the processing cost feature parameter; and
calculating the use cost data of the external data table according to the use cost feature parameter.

10. The method of claim 9, wherein:
the use cost feature parameter includes a second compute cost parameter; and the extracting the processing cost feature parameter of the general data table on which the external data table of the non-data common layer is dependent includes:
extracting a first compute cost parameter of the general data table on which the external data table is dependent.

11. The method of claim 10, wherein the calculating the use cost feature parameter of the external data table according to the processing cost feature parameter includes:
acquiring a compute cost calculation factor between the external data table and the general data table on which the external data table is dependent; and
correcting the first compute cost parameter according to the compute cost calculation factor to obtain the second compute cost parameter.

12. The method of claim 9, wherein:
the use cost feature parameter includes a second storage cost parameter;
the extracting the processing cost feature parameter of the general data table on which the external data table of the non-data common layer is dependent includes:
extracting a first storage cost parameter of the general data table on which the external data table is dependent.

13. The method of claim 12, wherein the calculating the use cost feature parameter of the external data table according to the processing cost feature parameter includes:
acquiring a storage cost calculation factor between the external data table and the general data table on which the external data table is dependent; and
correcting the first storage cost parameter according to the storage cost calculation factor to obtain the second storage cost parameter.

14. The method of claim 9, wherein:
the use cost feature parameter includes a second scan cost parameter;
the extracting the processing cost feature parameter of the general data table on which the external data table of the non-data common layer is dependent includes extracting a first scan cost parameter of the general data table on which the external data table is dependent; and
the calculating the use cost feature parameter of the external data table according to the processing cost feature parameter further includes:
acquiring a scan cost calculation factor between the external data table and the general data table on which the external data table is dependent; and
correcting the first scan cost parameter according to the storage cost calculation factor to obtain the second scan cost parameter.

15. The method of claim 1, further comprising:
extracting a corresponding general data table when the processing cost data meets a first preset condition.

16. The method of claim 15, wherein the extracting the corresponding general data table when the processing cost data meets a first preset condition includes one or more of the following:
extracting a general data table in response to determining that a ratio of a first storage cost parameter of the general data table to a first compute cost parameter of the general data table is higher than a first preset threshold;
extracting a general data table in response to determining that a first compute cost parameter of the general data table is higher than a second preset threshold;
extracting a general data table in response to determining that a ratio of a first scan cost parameter of the general data table to a first compute cost parameter of the general data table is higher than a third preset threshold; and
counting a sum of second compute cost parameters of external data tables having a direct dependence relationship with a general data table, and extracting the general data table in response to determining that a first compute cost parameter of the general data table is greater than the sum of the second compute cost parameters.

17. The method of claim 15, wherein the extracting the corresponding general data table when the processing cost data meets a first preset condition includes one or more of the following:
counting a sum of second storage cost parameters of external data tables having a direct dependence relationship with a general data table, and extracting the general data table in response to determining that a first storage cost parameter of the general data table is greater than the sum of the second storage cost parameters;
counting a sum of second scan cost parameters of external data tables having a direct dependence relationship with a general data table; and
extracting the general data table in response to determining that a first scan cost parameter of the general data table is greater than the sum of the second scan cost parameters.

18. The method of claim 1, further comprising:
extracting a corresponding external data table when the use cost data meets a second preset condition,
wherein the extracting the corresponding external data table when the processing cost data meets the second preset condition includes one or more of the following:
extracting an external data table in response to determining that a ratio of a second storage cost parameter of the external data table to a second compute cost parameter of the external data table is higher than a fourth preset threshold; and
extracting an external data table in response to determining that the external data table is capable of obtaining the same data as that in a current general data table from another general data table and a second scan cost parameter of the external data table when acquiring data from the another general data table is less than a second scan cost parameter of the external data table when acquiring data from the current general data table.

19. An apparatus comprising:
one or more processors; and
one or more memories storing thereon computer-readable instructions that, when executed by the one or more processors, cause the one or more processors to perform acts comprising:
calculating processing cost data of a general data table of a data common layer;
determining a general data table on which an external data table of a non-data common layer is dependent; and
calculating use cost data of the external data table according to the processing cost data of the general data table.

20. One or more memories storing thereon computer-readable instructions that, when executed by one or more processors, cause the one or more processors to perform acts comprising:
calculating processing cost data of a general data table of a data common layer;

determining a general data table on which an external data table of a non-data common layer is dependent; and calculating use cost data of the external data table according to the processing cost data of the general data table, the calculating the processing cost data of the general data table of the data common layer including:

extracting a processing cost feature parameter of the general data table of the data common layer, the processing cost feature parameter including a first scan cost parameter, the extracting the processing cost feature parameter of the general data table of the data common layer including:

counting a number of parent tables on which the general data table is dependent;

acquiring a scan size of the general data table with respect to the parent tables; and counting a number of child tables under the parent tables; and calculating the processing cost data of the general data table according to the processing cost feature parameter.

\* \* \* \* \*